United States Patent
Kim et al.

(10) Patent No.: US 11,573,891 B2
(45) Date of Patent: Feb. 7, 2023

(54) MEMORY CONTROLLER FOR SCHEDULING COMMANDS BASED ON RESPONSE FOR RECEIVING WRITE COMMAND, STORAGE DEVICE INCLUDING THE MEMORY CONTROLLER, AND OPERATING METHOD OF THE MEMORY CONTROLLER AND THE STORAGE DEVICE

(71) Applicant: SK hynix Inc., Icheon (KR)

(72) Inventors: Do Hun Kim, Icheon (KR); Ju Hyun Kim, Icheon (KR); Jin Yeong Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/104,973

(22) Filed: Nov. 25, 2020

(65) Prior Publication Data
US 2021/0157721 A1    May 27, 2021

(30) Foreign Application Priority Data

Nov. 25, 2019  (KR) .................... 10-2019-0152195
May 21, 2020  (KR) .................... 10-2020-0061130
Jul. 7, 2020    (KR) .................... 10-2020-0083485

(51) Int. Cl.
*G06F 12/02*    (2006.01)
*G06F 12/0804*  (2016.01)
(Continued)

(52) U.S. Cl.
CPC ...... *G06F 12/0246* (2013.01); *G06F 12/0292* (2013.01); *G06F 12/0804* (2013.01);
(Continued)

(58) Field of Classification Search
CPC ............ G06F 12/0246; G06F 12/0292; G06F 12/0804; G06F 12/0868; G06F 13/1605; G06F 13/1668
See application file for complete search history.

(56) References Cited

U.S. PATENT DOCUMENTS 4,484,262 A   11/1984  Sullivan et al.
5,509,132 A   4/1996   Matsuda et al.
(Continued)

FOREIGN PATENT DOCUMENTS

KR    100293276 B1    9/2001
KR    101014040 B1    2/2011
(Continued)

OTHER PUBLICATIONS

Notice of allowance dated Jun. 24, 2021 for U.S. Appl. No. 16/887,520.
(Continued)

*Primary Examiner* — Tasnima Matin

(57) ABSTRACT

An electronic device includes a memory controller having an improved operation speed. The memory controller includes a processor configured to generate commands for accessing data stored in a main memory, a scheduling circuit configured to store the commands and output the commands according to a preset criterion, and a filtering circuit configured to store information on an address of the main memory corresponding to a write command among the commands, provide a pre-completion response for the write command to the scheduling circuit upon receiving the write command, and provide the write command to the main memory.

18 Claims, 27 Drawing Sheets

(51) Int. Cl.
*G06F 13/16* (2006.01)
*G06F 12/0868* (2016.01)
(52) U.S. Cl.
CPC ...... *G06F 12/0868* (2013.01); *G06F 13/1605* (2013.01); *G06F 13/1668* (2013.01)

(56) References Cited

U.S. PATENT DOCUMENTS

| | | | |
|---|---|---|---|
| 5,604,753 | A | 2/1997 | Bauer et al. |
| 5,751,995 | A | 5/1998 | Sarangdhar |
| 5,799,165 | A | 8/1998 | Favor et al. |
| 6,101,596 | A | 8/2000 | Tanaka et al. |
| 6,490,642 | B1 | 12/2002 | Thekkath et al. |
| 6,621,829 | B1 * | 9/2003 | Achilles ............... H04L 29/06 370/235 |
| 7,091,979 | B1 | 8/2006 | Donovan |
| 7,349,398 | B1 * | 3/2008 | Favor .................. H04L 49/90 370/394 |
| 8,046,551 | B1 | 10/2011 | Sahin |
| 8,112,595 | B1 | 2/2012 | Bar-El |
| 8,135,918 | B1 * | 3/2012 | Yueh .................... G06F 13/28 711/147 |
| 8,464,008 | B1 | 6/2013 | Bar-El |
| 8,909,860 | B2 | 12/2014 | Rao |
| 9,851,905 | B1 * | 12/2017 | Ramalingam ........ G06F 3/0611 |
| 9,983,380 | B2 | 5/2018 | Ware et al. |
| 10,612,684 | B2 | 4/2020 | Grajeda et al. |
| 2003/0051099 | A1 * | 3/2003 | Yoaz ................... G06F 9/3832 711/118 |
| 2003/0120880 | A1 | 6/2003 | Banno |
| 2004/0128432 | A1 | 7/2004 | Nakajima |
| 2006/0136656 | A1 | 6/2006 | Conley et al. |
| 2006/0161724 | A1 | 7/2006 | Bennett et al. |
| 2008/0086575 | A1 * | 4/2008 | Foong ............... G06F 9/45537 709/250 |
| 2008/0288752 | A1 | 11/2008 | Cox et al. |
| 2008/0294813 | A1 | 11/2008 | Gorobets |
| 2009/0300297 | A1 | 12/2009 | Ikeuchi et al. |
| 2010/0039996 | A1 * | 2/2010 | Ohta .................... H04L 47/34 370/328 |
| 2010/0095073 | A1 * | 4/2010 | Caulkins ............ G06F 12/0866 711/154 |
| 2010/0205406 | A1 | 8/2010 | Hooker et al. |
| 2010/0205407 | A1 | 8/2010 | Henry et al. |
| 2010/0287333 | A1 | 11/2010 | Lee et al. |
| 2011/0022779 | A1 | 1/2011 | Lund et al. |
| 2011/0040906 | A1 | 2/2011 | Chung et al. |
| 2011/0047437 | A1 | 2/2011 | Flynn |
| 2011/0072196 | A1 | 3/2011 | Forhan et al. |
| 2012/0144448 | A1 | 6/2012 | Gunawardena et al. |
| 2012/0297147 | A1 | 11/2012 | Mylly et al. |
| 2012/0324250 | A1 | 12/2012 | Chakraborty et al. |
| 2013/0124794 | A1 | 5/2013 | Bux et al. |
| 2013/0205097 | A1 | 8/2013 | Flynn et al. |
| 2014/0059275 | A1 | 2/2014 | Yun et al. |
| 2014/0281806 | A1 | 9/2014 | Sharon et al. |
| 2014/0297603 | A1 | 10/2014 | Kim et al. |
| 2014/0325153 | A1 | 10/2014 | Huang |
| 2015/0095579 | A1 | 4/2015 | Samih et al. |
| 2015/0317089 | A1 * | 11/2015 | Ho ....................... G06F 9/455 711/102 |
| 2015/0356019 | A1 | 12/2015 | Johar et al. |
| 2015/0370734 | A1 | 12/2015 | Mangano et al. |
| 2016/0006461 | A1 | 1/2016 | Yin et al. |
| 2016/0077749 | A1 | 3/2016 | Ravimohan et al. |
| 2016/0162416 | A1 | 6/2016 | Boyd et al. |
| 2016/0224603 | A1 * | 8/2016 | Yang ................... H04L 12/413 |
| 2016/0230962 | A1 | 8/2016 | Yan et al. |
| 2017/0004095 | A1 | 1/2017 | Takeda et al. |
| 2017/0031615 | A1 | 2/2017 | Lee |
| 2017/0031626 | A1 | 2/2017 | Kim et al. |
| 2017/0046259 | A1 | 2/2017 | McKean et al. |
| 2017/0075823 | A1 | 3/2017 | Ward et al. |
| 2017/0131951 | A1 | 5/2017 | Miura |
| 2017/0242752 | A1 | 8/2017 | Lee |
| 2017/0286421 | A1 | 10/2017 | Hayenga et al. |
| 2017/0344366 | A1 | 11/2017 | Beard et al. |
| 2018/0004698 | A1 | 1/2018 | Brouwer et al. |
| 2018/0006963 | A1 | 1/2018 | Brouwer et al. |
| 2018/0052613 | A1 | 2/2018 | McDaniel et al. |
| 2018/0074850 | A1 | 3/2018 | Benjamini et al. |
| 2018/0074979 | A1 * | 3/2018 | Tanaka ................ G06F 13/4031 |
| 2018/0130537 | A1 | 5/2018 | Kim et al. |
| 2018/0173654 | A1 * | 6/2018 | Hong .................. G06F 12/1009 |
| 2018/0239701 | A1 | 8/2018 | Baptist et al. |
| 2018/0253353 | A1 | 9/2018 | Takase |
| 2018/0374550 | A1 | 12/2018 | Barndt et al. |
| 2019/0129971 | A1 | 5/2019 | Hironaka et al. |
| 2019/0146911 | A1 | 5/2019 | Ha et al. |
| 2019/0266096 | A1 | 8/2019 | Lee et al. |
| 2020/0142636 | A1 | 5/2020 | Liao |
| 2020/0226050 | A1 | 7/2020 | Lyberis et al. |
| 2020/0319821 | A1 * | 10/2020 | Sallese ................ G06F 3/0685 |
| 2021/0055864 | A1 | 2/2021 | Noh et al. |
| 2021/0157590 | A1 | 5/2021 | King et al. |
| 2021/0157721 | A1 | 5/2021 | Kim et al. |
| 2021/0191863 | A1 | 6/2021 | Choi et al. |
| 2021/0200470 | A1 | 7/2021 | Chan |

FOREIGN PATENT DOCUMENTS

| | | |
|---|---|---|
| KR | 1020130032157 A | 4/2013 |
| KR | 20150138713 A | 12/2015 |
| KR | 20160035737 A | 4/2016 |
| KR | 101711945 B1 | 3/2017 |
| KR | 20170070920 A | 6/2017 |
| KR | 101790165 B1 | 11/2017 |
| KR | 10-1858159 B1 | 6/2018 |
| KR | 101858159 B1 | 6/2018 |
| KR | 1020180080589 A | 7/2018 |
| KR | 20180104830 A | 9/2018 |
| KR | 20190054974 A | 5/2019 |
| KR | 101992934 B1 | 6/2019 |
| KR | 20190067088 A | 6/2019 |
| KR | 102002925 B1 | 7/2019 |
| KR | 20190082584 A | 7/2019 |
| KR | 1020190109987 A | 9/2019 |
| KR | 1020200019431 A | 2/2020 |
| KR | 20200095103 A | 8/2020 |

OTHER PUBLICATIONS

Office Action dated Oct. 7, 2020 for U.S. Appl. No. 16/111,044.
Office Action dated Jan. 13, 2022 for U.S. Appl. No. 16/995,567.
Office Action dated May 2, 2022 for U.S. Appl. No. 17/036,960.
Office Action dated May 20, 2022 for U.S. Appl. No. 16/995,567.
Office Action dated Sep. 9, 2022 for U.S. Appl. No. 16/995,567.

* cited by examiner

FIG. 5

Valid Page Table READ (501)

| bit1 | bit2 | bit3 | bit4 | bit5 | bit6 | bit7 | bit8 | bit9 | bit10 | ... |
|---|---|---|---|---|---|---|---|---|---|---|
| Clear | Clear | Clear | Clear | Clear | Clear | Clear | Clear | Clear | Clear | ... |

Valid Page Table MODIFY-WRITE (503)

| bit1 | bit2 | bit3 | bit4 | bit5 | bit6 | bit7 | bit8 | bit9 | bit10 | ... |
|---|---|---|---|---|---|---|---|---|---|---|
| Set | Clear | Clear | Clear | Clear | Clear | Clear | Clear | Clear | Clear | ... |

Valid Page Table READ (505)

| bit1 | bit2 | bit3 | bit4 | bit5 | bit6 | bit7 | bit8 | bit9 | bit10 | ... |
|---|---|---|---|---|---|---|---|---|---|---|
| Set | Clear | Clear | Clear | Clear | Clear | Clear | Clear | Clear | Clear | ... |

Valid Page Table MODIFY-WRITE (507)

| bit1 | bit2 | bit3 | bit4 | bit5 | bit6 | bit7 | bit8 | bit9 | bit10 | ... |
|---|---|---|---|---|---|---|---|---|---|---|
| Set | Set | Clear | Clear | Clear | Clear | Clear | Clear | Clear | Clear | ... |

FIG. 20

| META DATA | | |
|---|---|---|
| META SLICE 1 (L2P) | NEW | OLD |
| META SLICE 2 (L2P) | NEW | OLD |
| META SLICE 3 (L2P) | NEW | OLD |
| META SLICE 4 (L2P) | NEW | OLD |
| META SLICE 5 (L2P) | NEW | OLD |
| META SLICE 6 (L2P) | NEW | OLD |
| META SLICE 7 (L2P) | NEW | OLD |
| META SLICE 8 (L2P) | NEW | OLD |
| META SLICE 9 (L2P) | NEW | OLD |
| META SLICE 10 (L2P) | NEW | OLD |
| META SLICE 11 (L2P) | NEW | OLD |
| META SLICE 12 (L2P) | NEW | OLD |
| META SLICE 13 (L2P) | NEW | OLD |
| META SLICE 14 (L2P) | NEW | OLD |
| META SLICE 15 (L2P) | NEW | OLD |

| JOURNAL_DATA |
|---|
| JOURNAL DATA1 |
| JOURNAL DATA2 |

MEMORY CONTROLLER FOR SCHEDULING COMMANDS BASED ON RESPONSE FOR RECEIVING WRITE COMMAND, STORAGE DEVICE INCLUDING THE MEMORY CONTROLLER, AND OPERATING METHOD OF THE MEMORY CONTROLLER AND THE STORAGE DEVICE

CROSS-REFERENCE TO RELATED APPLICATION

The present application claims priority under 35 U.S.C. § 119(a) to Korean patent application number 10-2019-0152195 filed on Nov. 25, 2019, Korean patent application number 10-2020-0061130, filed on May 21, 2020, and Korean patent application number 10-2020-0083485, filed on Jul. 7, 2020. The disclosure of each of the foregoing applications is incorporated herein by reference in its entirety.

BACKGROUND

1. Field of Invention

The present disclosure relates to an electronic device, and more particularly, to a storage device for meta data management and a method of operating the same.

2. Description of Related Art

A storage is a device that stores data under the control of a host device such as a computer or a smartphone. A storage device may include a memory device storing data and a memory controller controlling the memory device. The memory device may be classified into a volatile memory device and a non-volatile memory device.

The volatile memory device may be a device that stores data only when power is supplied thereto and loses the stored data when the power supply is cut off. The volatile memory device may include a static random access memory (SRAM), a dynamic random access memory (DRAM), and the like.

The non-volatile memory device is a device that does not lose stored data even when power is cut off. The non-volatile memory device may include a read only memory (ROM), a programmable ROM (PROM), an electrically programmable ROM (EPROM), an electrically erasable and programmable ROM (EEPROM), a flash memory, and the like.

SUMMARY

Embodiments of the present disclosure provide a memory controller having an improved operation speed, and a method of operating the same.

An embodiment of the present disclosure may provide for a memory controller that includes a processor configured to generate commands for accessing data stored in a main memory, a scheduling circuit configured to store the commands and output the commands according to a preset criterion, and a filtering circuit configured to store information on an address of the main memory corresponding to a write command among the commands, provide a pre-completion response for the write command to the scheduling circuit upon receiving the write command, and provide the write command to the main memory.

An embodiment of the present disclosure may provide for a method of operating a memory controller. The method may include generating, by a processor, commands for accessing data stored in a main memory, storing the commands and outputting the commands according to a preset criterion, by a scheduling circuit, and storing information on an address of the main memory corresponding to a write command among the commands, providing a pre-completion response for the write command to the scheduling circuit upon receiving the write command and providing the write command to the main memory, by a filtering circuit.

BRIEF DESCRIPTION OF THE DRAWINGS

FIG. 5 is a diagram for describing a read-modify-write operation of a valid page table (VPT) of a physical address.

FIG. 20 illustrates the structure of meta data in the memory system according to an embodiment.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

In an embodiment, a memory controller may include cache architecture using a hazard filter to reduce a read latency of a main memory. The hazard filter may provide a read request to the main memory without waiting for the completion of a write request when the write request is not for the same address as the read request following the write request.

In another embodiment, a memory controller may include a scheduler including a read modified write (RMW) processing engine and an out-of-order scheduling engine, so that resources may be fully utilized and the overall execution time may be reduced, In still another embodiment, when multiple meta slices included in meta data and journal data are written in a memory device, an operation of writing the meta slice and an operation of writing the journal data are controlled to be asynchronously performed to minimize a time taken for an operation of writing meta data in the memory device.

The disclosure in U.S. patent application Ser. No. 16/995,567, is incorporated herein by reference in its entirety.

Figure 1:
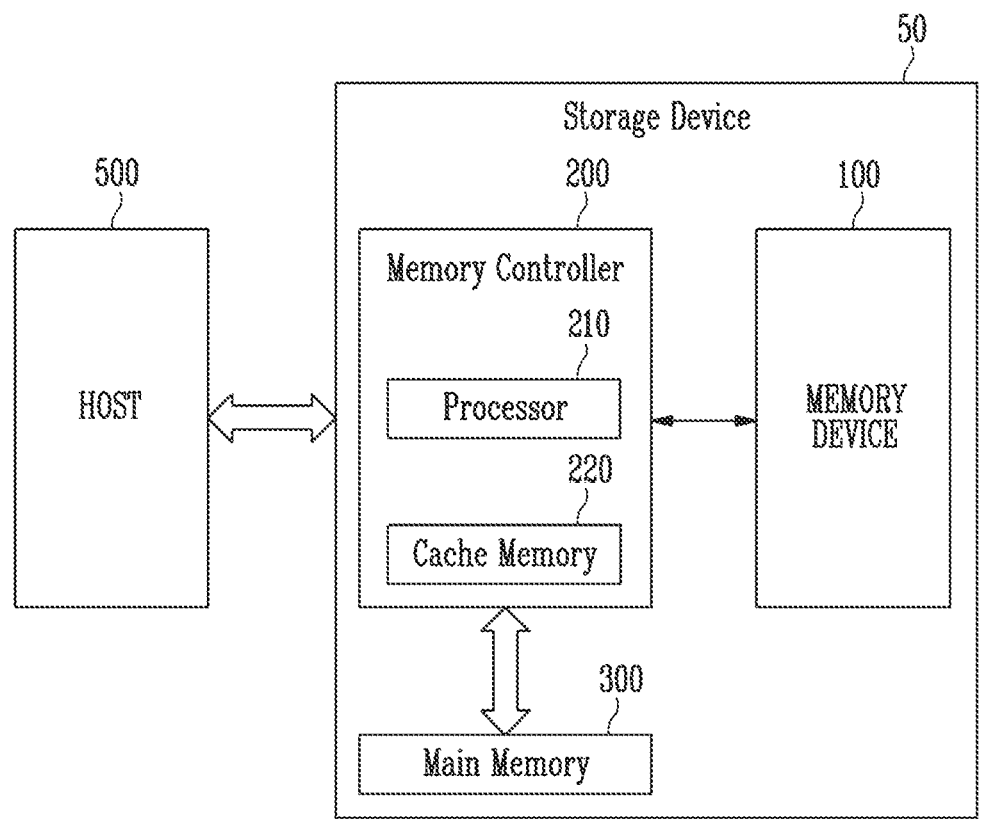
FIG. 1 is a diagram for describing a storage device according to an embodiment of the present disclosure.

FIG. 1 is a diagram for describing a storage device 50 according to an embodiment of the present disclosure.

Referring to FIG. 1, the storage device 50 may include a memory device 100 and a memory controller 200 that controls an operation of the memory device 100. The storage device 50 may be a device that stores data under the control of a host 500 such as a cellular phone, a smartphone, an MP3 player, a laptop computer, a desktop computer, a game player, a TV, a tablet PC, an in-vehicle infotainment system, or the like.

The storage device 50 may be one of various types of storage devices according to a host interface that is a communication method with the host 500. For example, the storage device 50 may include one of an SSD, a multimedia card in the form of an MMC, an eMMC, an RS-MMC, or a micro-MMC, a secure digital card in the form of an SD, a mini-SD, or a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so on.

The storage device 50 may be manufactured as one of various types of packages. For example, the storage device 50 may be manufactured as one of a package on package (POP), a system in package (SIP), a system on chip (SOC), a multi-chip package (MCP), a chip on board (COB), a wafer-level fabricated package (WFP), a wafer-level stack package (WSP), and so on.

The memory device 100 may store data. The memory device 100 operates under the control of the memory controller 200. The memory device 100 may include a memory cell array (not shown) including a plurality of memory cells that store data.

Each of the memory cells may be configured as a single level cell (SLC) that stores one-bit data, a multi-level cell (MLC) that stores two-bit data, a triple level cell (TLC) that stores three-bit data, or a quad level cell (QLC) capable of storing four-bit data.

The memory cell array (not shown) may include a plurality of memory blocks. One memory block may include a plurality of pages. In an embodiment, a page may be a unit for storing data in the memory device 100 or reading data stored in the memory device 100. A memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command CMD and an address ADDR from the memory controller 200 and access an area selected by the address ADDR in the memory cell array. The memory device 100 may perform an operation instructed by the command CMD on the area selected by the address ADDR. For example, the memory device 100 may perform a write operation (or program operation), a read operation, and an erase operation in response to the command CMD. During the program operation, the memory device 100 may program data in the area selected by the address ADDR. During the read operation, the memory device 100 may read data from the area selected by the address ADDR. During the erase operation, the memory device 100 may erase data stored in the area selected by the address ADDR.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 500, a flash translation layer (FTL) that controls communication between the memory controller 200 and the host 500, and a flash interface layer (FIL) that controls communication with the memory device 100.

In an embodiment, the memory controller 200 may receive data and a logical block address (LBA) from the host 500 and may convert the LBA into a physical block address (PBA) indicating an address of memory cells in the memory device 100 in which the received data is to be stored. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, or the erase operation according to a request of the host 500. During the program operation, the memory controller 200 may provide a write command, a PBA, and write data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may generate a command, an address, and data regardless of whether there is a request from the host 500, and transmit the command, the address, and the data to the memory device 100. For example, the memory controller 200 may provide a command, an address, and data for performing a read operation and program operations accompanying in performing wear leveling, read reclaim, garbage collection, and the like, to the memory device 100.

In an embodiment, the memory controller 200 may control two or more memory devices 100. In this case, the memory controller 200 may control the two or more memory devices 100 according to an interleaving method to improve operation performance. The interleaving method may be a method of controlling operations for the two or more memory devices 100 to overlap with each other.

The storage device 50 may further include a main memory 300. The main memory 300 may temporarily store data provided from the host 500 or may temporarily store data read from the memory device 100. In an embodiment, the main memory 300 may be a volatile memory device. For example, the main memory 300 may include a dynamic random access memory (DRAM), or a static random access memory (SRAM), or both.

In an embodiment, the main memory 300 may read meta data stored in the memory device 100 and store the read meta data therein.

The meta data may be data including various information required to control the storage device 50. For example, the meta data may include bad block information, which is information on a bad block among a plurality of memory blocks included in the memory device 100, and firmware to be executed by a processor 210 of the memory controller 200.

In an embodiment, the meta data may include map data indicating a correspondence relationship between the logical address provided by the host 500 and a physical address of memory cells included in the memory device 100, and a valid page table indicating whether data stored in pages included in the memory device 100 are valid data. In an embodiment, the valid page table may include a plurality of valid page tables. The valid page table may include data of a bitmap form indicating whether data stored in a page in a 4 KB unit are valid.

Alternatively, in various embodiments, the meta data may include read count data indicating the number of times of read operations performed on the memory blocks included in the memory device 100, cycling data indicating the number of times of erasures of the memory blocks included in the memory device 100, hot/cold data indicating whether data stored in pages included in the memory device 100 is hot data or cold data, and journal data indicating a changed content of the map data.

In an embodiment, the meta data stored in the main memory 300 may include data chunks having different types of data structures for types of the meta data. For example, the meta data may have different data sizes for the types thereof. Therefore, for the types of the meta data, the sizes of the meta data stored in the main memory 300 may be different from each other.

In an embodiment of the present disclosure, the memory controller 200 may include the processor 210 and a cache memory 220.

The processor 210 may control overall operations of the memory controller 200. The processor 210 may execute firmware (FW). The processor 210 may perform operations required to access the memory device 100. For example, the processor 210 may provide a command to the memory device 100 and control the memory device 100 and the main memory 300 to perform an operation corresponding to the command.

For example, when a write request is received from the host 500, the processor 210 may convert a logical address corresponding to the write request into a physical address. The processor 210 may store map data, which indicates a correspondence relationship between the logical address and the physical address, in the main memory 300.

In order to store the map data, the processor 210 may read a map segment including mapping information of the logical address provided by the host 500 from the main memory 300. Thereafter, the processor 210 may record the physical address corresponding to the logical address in the map segment. The processor 210 may store the map segment in which the physical address is recorded in the main memory 300 again. When the physical address is allocated, data of a valid page table corresponding to the allocated physical address may also be updated.

In an embodiment, the map data stored in the main memory 300 may be updated. For example, when a write request of new data is input with respect to a previously write requested logical address, previously stored data may become invalid data, and a physical address corresponding to the corresponding logical address may be changed. Alternatively, when a position where data is stored is changed by various background operations such as garbage collection, read reclaim, and wear leveling, the map data corresponding to the position of the data may be updated.

The cache memory 220 may store data to be accessed by the processor 210, the data being read from the main memory 300. A storage capacity of the cache memory 220 may be smaller than that of the main memory 300. In an embodiment, the cache memory 220 may be a volatile memory device. For example, the cache memory 220 may be a dynamic random access memory (DRAM) or a static random access memory (SRAM). The cache memory 220 may be a memory having an operation speed faster than that of the main memory 300.

Since the storage capacity of the cache memory 220 is smaller than that of the main memory 300, the cache memory 220 may store only meta data accessed by the processor 210 among the meta data stored in the main memory 300. Storing data, which stored in a specific address among the data stored in the main memory 300, in the cache memory 220 is referred to as caching.

When the cache memory 220 stores data to be accessed by the processor 210 that is read from the main memory 300, the cache memory 220 may provide the corresponding data to the processor 210. Since the operation speed of the cache memory 220 is faster than that of the main memory 300, when the data to be accessed by the processor 210 is stored in the cache memory 220, the processor 210 may obtain the data faster than obtaining the data from the main memory 300. A case where the data to be accessed by the processor 210 is stored in the cache memory 220 is referred to as a cache hit, and a case where the data to be accessed by the processor 210 is not stored in the cache memory 220 is referred to as a cache miss. As the number of cache hits increases, a speed of an operation processed by the processor 210 may be increased.

An operation method of the cache memory 220 may be classified into a direct mapped cache, a set associative cache, or a fully associative cache.

The direct mapped cache may be a many-to-one (n:1) method in which a plurality of addresses of the main memory 300 correspond to one address of the cache memory 220. That is, in the direct mapped cache, data stored in a specific address of the main memory 300 may be cached in a pre-mapped address of the cache memory 220.

The fully associative cache may be an operation method in which an address of the cache memory 220 is not pre-mapped to a specific address of the main memory 300 and thus an address of an empty portion of the cache memory 220 may cache data stored in any address of the main memory 300. The fully associative cache is required to search for all addresses of the cache memory 220 when determining whether there is a cache hit or not.

The set associative cache is an intermediate form of the direct mapped cache and the fully associative cache, and manages the cache memory 220 by dividing the cache memory 220 into a plurality of cache sets. In addition, a cache set may be divided into cache ways or cache lines.

The host 500 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
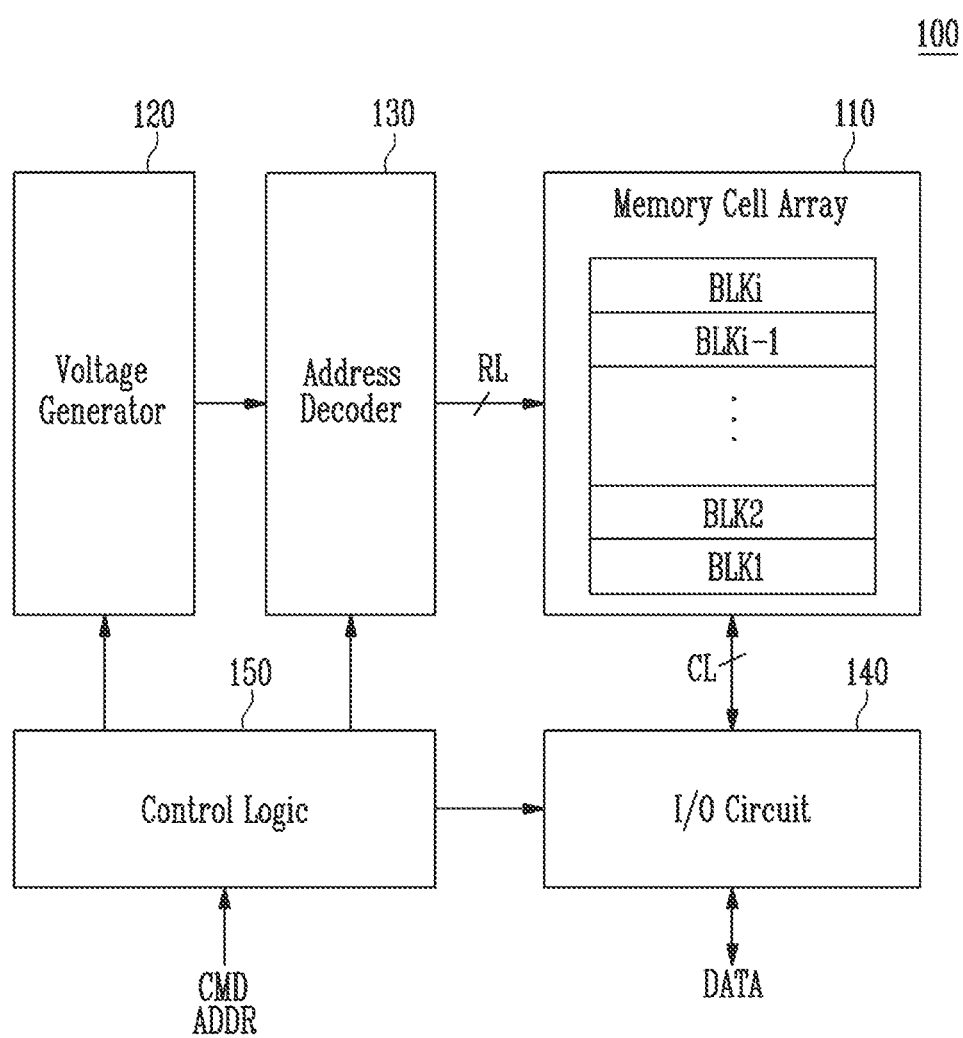
FIG. 2 is a diagram for describing a memory device of FIG. 1.

FIG. 2 is a diagram for describing the memory device 100 of FIG. 1.

Referring to FIG. 2, the memory device 100 may include a memory cell array 110, a voltage generator 120, an address decoder 130, an input/output (I/O) circuit 140, and a control logic 150.

The memory cell array 110 includes a plurality of memory blocks BLK1 to BLKi, i being a positive integer greater than 1. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be non-volatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one-bit data, a multi-level cell (MLC) that stores two-bit data, a triple level cell (TLC) that stores three-bit data, or a quad level cell (QLC) capable of storing four-bit data.

In an embodiment, the voltage generator 120, the address decoder 130, and the input/output circuit 140 may be collectively referred to as a peripheral circuit. The peripheral circuit may drive the memory cell array 110 under the control of the control logic 150. The peripheral circuit may drive the memory cell array 110 to perform a program operation, a read operation, and an erase operation.

The voltage generator 120 is configured to generate a plurality of operation voltages using an external power voltage supplied to the memory device 100. The voltage generator 120 operates under the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using the external power voltage or the internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage, and may generate the plurality of operation voltages having various voltage levels by selectively activating the plurality of pumping capacitors under the control of the control logic 150.

The plurality of operation voltages generated by the voltage generator 120 may be supplied to the memory cell array 110 through the address decoder 130.

The address decoder 130 is connected to the memory cell array 110 through the row lines RL. The address decoder 130 is configured to operate under the control of the control logic 150. The address decoder 130 may receive an address ADDR from the control logic 150. The address decoder 130 may decode a block address among the received address ADDR. The address decoder 130 selects at least one memory block among the memory blocks BLK1 to BLKi according to the decoded block address. The address decoder 130 may decode a row address among the received address ADDR. The address decoder 130 may select at least one word line among word lines of the selected memory block according to the decoded row address. In an embodiment, the address decoder 130 may decode a column address among the received address ADDR. The address decoder 130 may connect the input/output circuit 140 and the memory cell array 110 to each other according to the decoded column address.

According to an embodiment of the present disclosure, during the read operation, the address decoder 130 may apply a read voltage to the selected word line, and apply a read pass voltage to unselected word lines, the read pass voltage having a higher voltage level than the read voltage.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, write data may be stored in selected memory cells based on data stored in the plurality of page buffers that corresponds to input data DATA provided by an external device.

During the read operation, read data stored in the selected memory cells may be sensed through the bit lines, and the sensed data may be stored in the page buffers. After that, the data stored in the page buffers is output to the external device as output data DATA.

The control logic 150 may control the address decoder 130, the voltage generator 120, and the input/output circuit 140. The control logic 150 may operate in response to a command CMD transmitted from the external device. The control logic 150 may generate various signals in response to the command CMD and the address ADDR to control the peripheral circuits.

Figure 3:
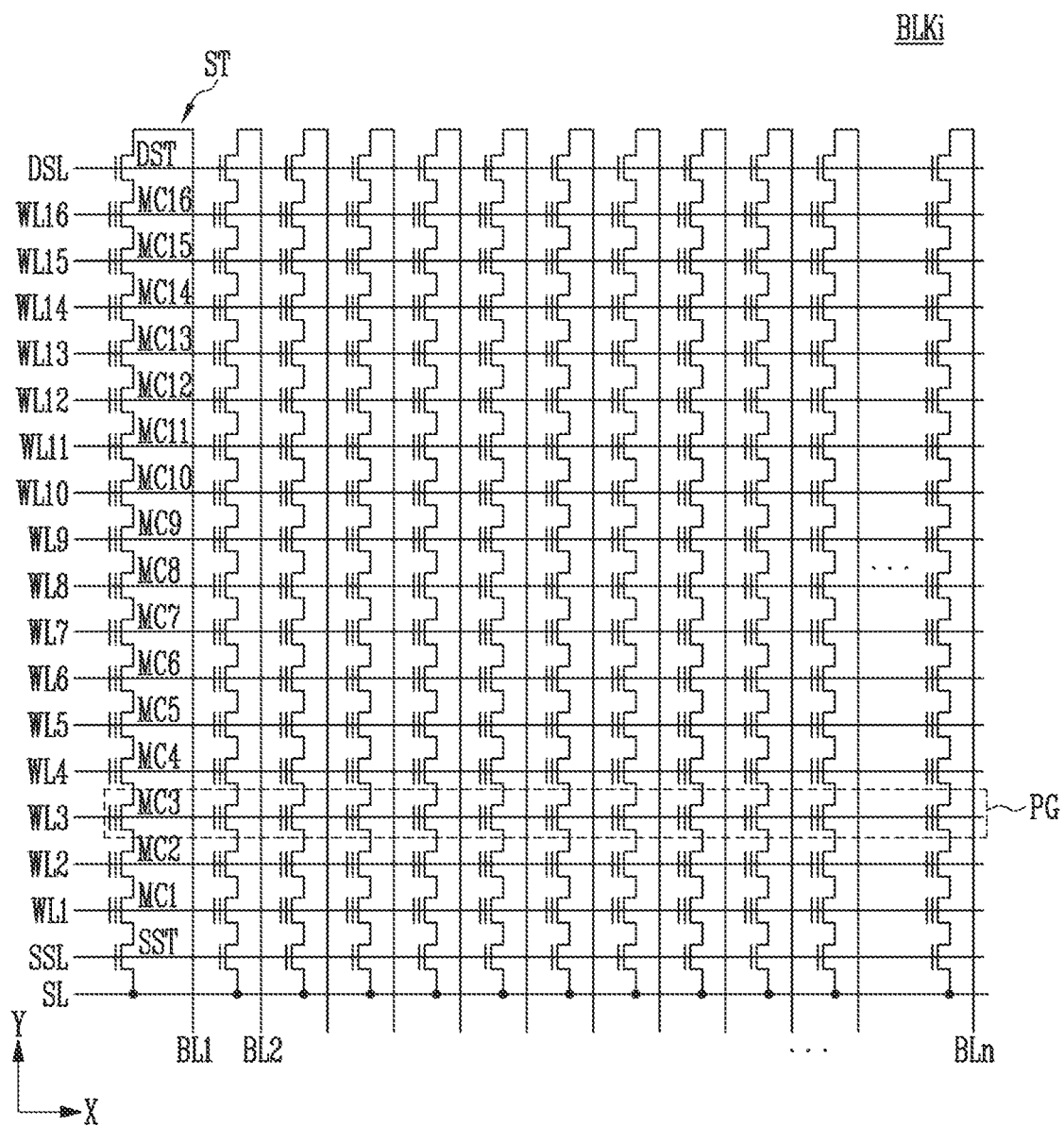
FIG. 3 is a diagram for describing a configuration of any one of memory blocks of FIG. 2.

FIG. 3 is a diagram for describing a configuration of any one of the memory blocks of FIG. 2.

For example, the memory block BLKi is shown in FIG. 3.

Referring to FIG. 3, a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 will be specifically described as an example.

The string ST may include a source select transistor SST, a plurality of memory cells MC1 to MC16, and a drain select transistor DST connected in series between the source line SL and the first bit line BL1. In an embodiment, one string ST may include at least one source select transistor SST and at least one drain select transistor DST, and may include the memory cells MC1 to MC16, but embodiments are not limited thereto. In another embodiment, the number of memory cells included in one string may be greater than 16.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be commonly connected to the source select line SSL, gates of the drain select transistors DST in the different strings ST may be commonly connected to the drain select line DSL, and gates of the memory cells MC1 to MC16 in the different strings ST may be commonly connected to the plurality of word lines WL1 to WL16, respectively. A group of memory cells connected to the same word line among the memory cells included in the different strings ST may be referred to as a page PG. Therefore, the memory block BLKi may include a plurality of pages PG whose number is the same as the number of the word lines WL1 to WL16.

One memory cell may store one-bit data. This is commonly called a single level cell (SLC). In this case, one physical page PG may store data corresponding to one logical page (LPG). The data corresponding to one logical page (LPG) may include data bits having the same number as cells included in one physical page PG.

In other embodiments, one memory cell may store two or more bits of data. In this case, one physical page PG may store data corresponding to two or more logical pages.

Figure 4:
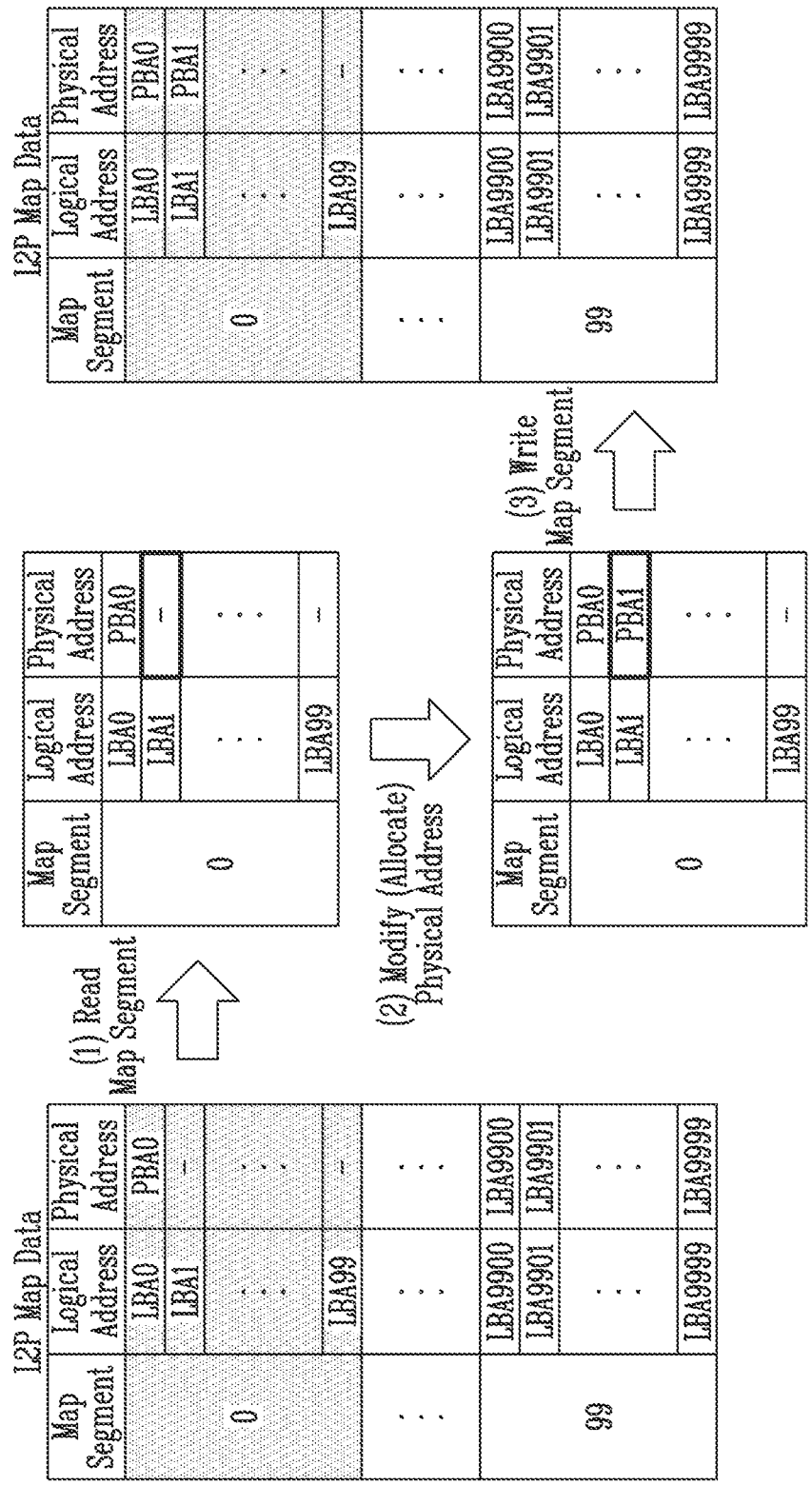
FIG. 4 is a diagram for describing a read-modify-write operation on L2P map data stored in a main memory described with reference to FIG. 1.

FIG. 4 is a diagram for describing a read-modify-write operation on logical-to-physical (L2P) map data stored in the main memory 300 described with reference to FIG. 1.

Referring to FIGS. 1 and 4, the L2P map data stored in the main memory 300 may be updated.

For example, when a write request is input from the host 500, the processor 210 may allocate a physical address to a logical address input from the host 500 according to the write request, and update valid page table information corresponding to the physical address. After that, when a write request for writing new data is input with respect to a previously write requested logical address, previously stored data may become invalid data, and a new physical address may be allocated to the previously write requested logical address. That is, the physical address allocated to the logical address is changed. In the meantime, when a position where data is stored is changed by various background operations such as garbage collection, read reclaim, and wear leveling, the L2P map data may be updated.

The L2P map data may include a plurality of map segments. Each of the map segments may include a plurality of map entries. A map entry may include information on a correspondence relationship between a logical address and a physical address.

Here, it is assumed that a write request of data corresponding to a first logical block address LBA1 is input from the host 500. The processor 210 may read a map segment 0 that includes a map entry of the first logical block address LBA1 among the L2P map data stored in the main memory 300 (1).

The processor 210 may allocate a first physical block address PBA1 as a physical address corresponding to the first logical block address LBA1(2).

The processor 210 may store the map segment 0, which includes the map entry of the first logical block address LBA1 to which the first physical block address PBA1 is allocated, in the main memory 300 (3). As a result, the L2P map data stored in the main memory 300 is updated.

FIG. 5 is a diagram for describing a read-modify-write operation of a valid page table (VPT) of a physical address.

The VPT may include data of a bitmap form indicating whether data stored in pages included in the memory device 100 are valid data. The VPT may include a plurality of bits respectively corresponding to a plurality of pages. A bit of a "set" state may indicate that data stored in a corresponding page is valid data, and a bit of a "clear" state may indicate that data stored in a corresponding page is invalid data.

Referring to FIGS. 1, 4, and 5, a VPT including a zero-th physical block address PBA0 and a first physical block address PBA1 will be described.

In general, when the memory controller 200 stores data in the memory device 100, the memory controller 200 secures a free block, which is an empty memory block storing no data, and then sequentially stores data in pages included in the free block. After storing the data in the pages, bits of the VPT corresponding to the pages are changed to the "set" state. Therefore, before storing the data, all bits of the VPT corresponding to a physical block address to be allocated may be of the "clear" state.

It is assumed that the map segment 0 described with reference to FIG. 4 is in a state in which the zero-th physical block address PBA0 is allocated as a physical address corresponding to the zero-th logical block address LBA0.

When it is assumed that a bit corresponding to a page of the zero-th physical block address PBA0 is a first bit bit1, the processor 210 may read a VPT including the zero-th physical block address PBA0 (501), and modify the "clear" state of the first bit bit1 to the "set" state. In an embodiment, a bit "1" may indicate the "set" state and a bit "0" may indicate the "clear" state. Alternatively, the bit "0" may indicate the "set" state and the bit "1" may indicate the "clear" state. The processor 210 may store the VPT in which the "clear" state of the first bit bit1 is modified to the "set" state in the main memory 300 (503).

Thereafter, since the first physical block address PBA1 is newly allocated as described with reference to FIG. 4, the processor 210 may read the VPT including the first physical block address PBA1 again (505).

When it is assumed that a bit corresponding to a page of the first physical block address PBA1 is a second bit bit2, the processor 210 may modify the "clear" state of the second bit bit2 to the "set" state.

The processor 210 may store the VPT in which the "clear" state of the second bit bit2 is modified to the "set" state in the main memory 300 (507).

In the embodiment described with reference to FIGS. 4 and 5, the main memory 300 may be accessed according to a data access pattern of the firmware (FW), and thus the cache memory 220 may be used accordingly.

For example, when write requests are sequentially input from the host 500, the data access pattern of the main memory 300 may be sequentially performed by the processor 210. That is, the L2P map data and the VPT may be continuously accessed in order to allocate a physical block address for storing data and to store a page of the allocated physical block address as a valid data page. Therefore, access to the L2P map data and the VPT may have very high locality.

Conversely, when write requests are randomly input from the host 500, the data access pattern of the main memory 300 may be processed by the processor 210 in a mixed manner of sequential access and random access. For example, access to the L2P map data may be random, and access to the VPT may be sequential.

Figure 6:
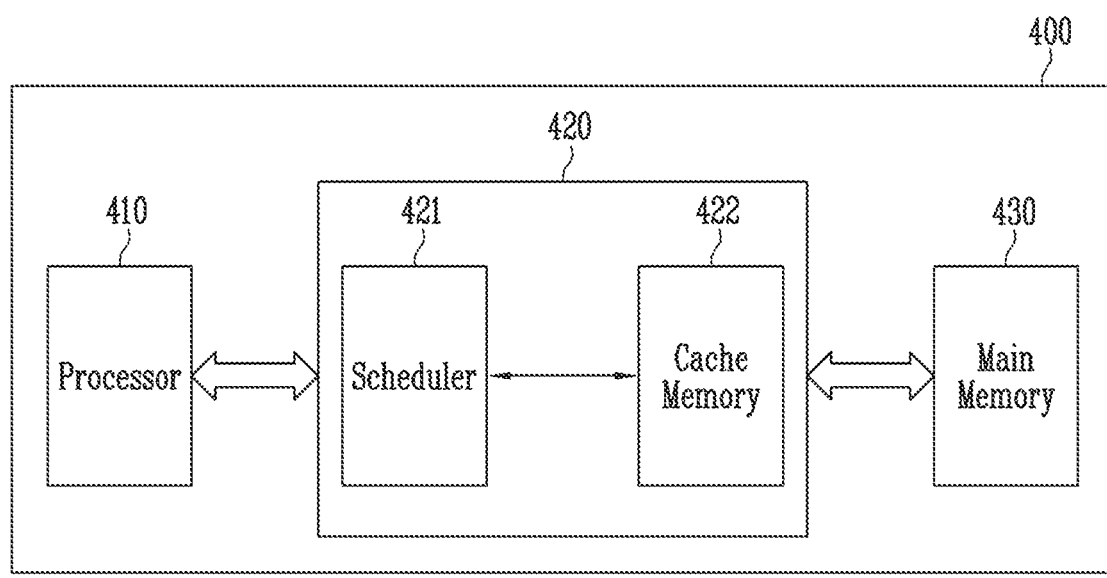
FIG. 6 is a diagram illustrating a structure of a memory controller according to an embodiment of the present disclosure.

FIG. 6 is a diagram illustrating a structure of a memory controller 400 according to an embodiment of the present disclosure.

Referring to FIG. 6, the memory controller 400 may include a processor 410, a cache controller 420, and a main memory 430.

The processor 410 and the main memory 430 may be respectively configured and operate identically to the processor 210 and the main memory 300 described with reference to FIG. 1.

The cache controller 420 may include a scheduler 421 and a cache memory 422.

The scheduler 421 may store access requests input from the processor 410 and addresses corresponding to the access requests. The scheduler 421 may provide an access request to the cache memory 422 or receive a completion response for the provided access request.

The scheduler 421 may receive an access request and an address to be accessed from the processor 410. When the access request received from the processor 410 is a write request, the scheduler 421 may receive the write request, a write address, and write data. The scheduler 421 may transfer the write request, the write address, and the write data to the cache memory 422. The write data may be stored in an area of the main memory 430 corresponding to the write address through the cache memory 422. The main memory 430 may store the write data in the area corresponding to the write address, and then provide a write completion response to the cache controller 420, the write completion response indicating that the write request has been performed. The write completion response may be transferred to the processor 410 through the cache memory 422 and the scheduler 421.

When the access request received from the processor 410 is a read request, the scheduler 421 may receive the read request and a read address. The scheduler 421 may transfer the read request and the read address to the cache memory 422. When data corresponding to the read request is cached in a cache line corresponding to the read address (cache hit), the cache memory 422 may provide the cached data to the scheduler 421. The scheduler 421 may transfer the received data to the processor 410. When the data corresponding to the read request is not cached in the cache line corresponding to the read address (cache miss), the cache memory 422 may provide the read request and the read address to the main memory 430. The main memory 430 may provide read data stored in an area corresponding to the read address to the cache controller 420. The read data may be stored in the cache line corresponding to the read address in the cache memory 422 (caching). The read data may be transferred to the processor 410 through the scheduler 421.

When a read request for an address corresponding to the same cache line as a write request is input before the write request is completed, data stored in the cache memory 422 may be different from data stored in the main memory 430, the read request being input after the write request. In this case, when data corresponding to the read request has been cached in the cache memory 422, the cache hit may occur, and thus the data that is different from the most recent write data may be provided to the processor 410 (hazard occurrence).

In order to prevent the hazard occurrence, when cache lines respectively corresponding to addresses of the input access requests collide, that is, first and second access requests for an address corresponding to the same cache line are input, the scheduler 421 may hold the second access request input after the first access request without transferring the second access request to the cache memory 422 until the first access request is processed.

However, considering the data access pattern of the main memory 430, a phenomenon that many read requests are held or pended inside the scheduler 421 by preceding write requests may frequently occur.

As a result, a read delay occurring in the cache memory 422 may become longer, and thus a processing speed of the processor 410 may be slower.

Figure 7:
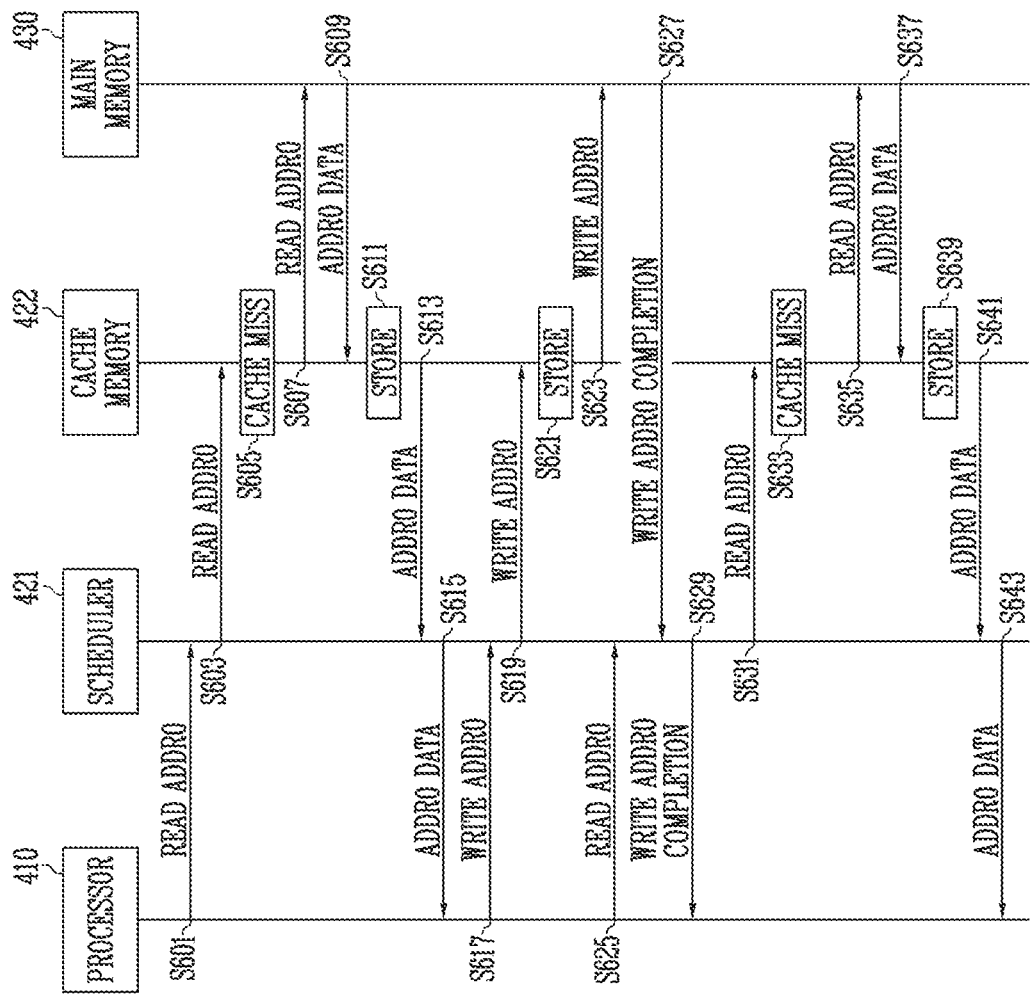
FIG. 7 is a flowchart illustrating an operation of the memory controller described with reference to FIG. 6.

FIG. 7 is a flowchart illustrating an operation of the memory controller 400 described with reference to FIG. 6.

Referring to FIGS. 6 and 7, in step S601, the processor 410 may provide a read request for an address ADDR0 to the scheduler 421.

In step S603, the scheduler 421 may store the read request for the address ADDR0, and since there was no preceding read or write request for the address ADDR0, the scheduler 421 may provide the read request for the address ADDR0 to the cache memory 422.

In step S605, the cache memory 422 may check whether data corresponding to the address ADDR0 has been cached in the cache memory 422. When the data corresponding to the address ADDR0 is not present in the cache memory 422, a cache miss may occur.

When the cache miss occurs, in step S607, the cache memory 422 may provide the read request for the address ADDR0 to the main memory 430.

In step S609, the main memory 430 may read out data corresponding to the address ADDR0, i.e., ADDR0 DATA, and provide the read data ADDR0 DATA to the cache memory 422.

In step S611, the cache memory 422 may store the read data ADDR0 DATA in the cache memory 422 (caching).

In step S613, the cache memory 422 may provide the read data ADDR0 DATA to the scheduler 421. In step S615, the scheduler 421 may provide the read data ADDR0 DATA to the processor 410.

In step S617, the processor 410 may provide a write request for the address ADDR0 to the scheduler 421.

In step S619, the scheduler 421 may provide the write request for the address ADDR0 to the cache memory 422.

In step S621, the cache memory 422 may store write data in the cache memory 422. Alternatively, the write data may not be stored in the cache memory 422, and an indication that data cached in a cache line corresponding to the address ADDR0 is dirty data may be stored in the cache memory 422.

In step S623, the cache memory 422 may provide the write request for the address ADDR0 to the main memory 430.

While the write request is performed in the main memory 430, in step S625, the processor 410 may provide another read request for the address ADDR0 to the scheduler 421. In this case, since the scheduler 421 has not yet received a write request completion response WRITE ADDR0 COMPLETION for the address ADDR0 that is the same address as the address ADDR0 for the other read request, the other read request is not output to the cache memory 422 and held or pended in the scheduler 421.

In step S627, the main memory 430 may perform the write request for the address ADDR0, i.e., store the write data in an area corresponding to the address ADDR0, and provide the write completion response WRITE ADDR0 COMPLETION to the scheduler 421.

In step S629, the scheduler 421 may provide the write completion response WRITE ADDR0 COMPLETION to the processor 410.

In step S631, the scheduler 421 may provide the other read request for the address ADDR0 to the cache memory 422.

In step S633, the cache memory 422 may check whether newly written data corresponding to the address ADDR0 has been cached in the cache memory 422. Since the newly written data corresponding to the address ADDR0 has not been cached in the cache memory 422, the cache miss may occur.

In step S635, the cache memory 422 may provide the other read request for the address ADDR0 to the main memory 430.

In step S637, the main memory 430 may read out the newly written data corresponding to the address ADDR0, i.e., ADDR0 DATA, and provide the read data ADDR0 DATA to the cache memory 422.

In step S639, the cache memory 422 may store the read data ADDR0 DATA in the cache memory 422 (caching).

In step S641, the cache memory 422 may provide the read data ADDR0 DATA to the scheduler 421. In step S643, the scheduler 421 may provide the read data ADDR0 DATA to the processor 410.

According to the embodiment described with reference to FIG. 7, when there is collision among the cache lines respectively corresponding to the addresses of the input access requests, e.g., when first and second access requests corresponding to an address corresponding to the same cache line are sequentially input, the scheduler 421 may hold the second access request without transferring the second access request to the cache memory 422 until the first access request is processed. Therefore, considering the data access pattern of the main memory 430 processed by the processor 410, a phenomenon that many read requests are held or pended inside the scheduler 421 by the preceding write requests may frequently occur. As a result, the read delay occurring in the cache memory 422 may become longer, and thus the process speed of the processor 410 may be slower.

Figure 8:
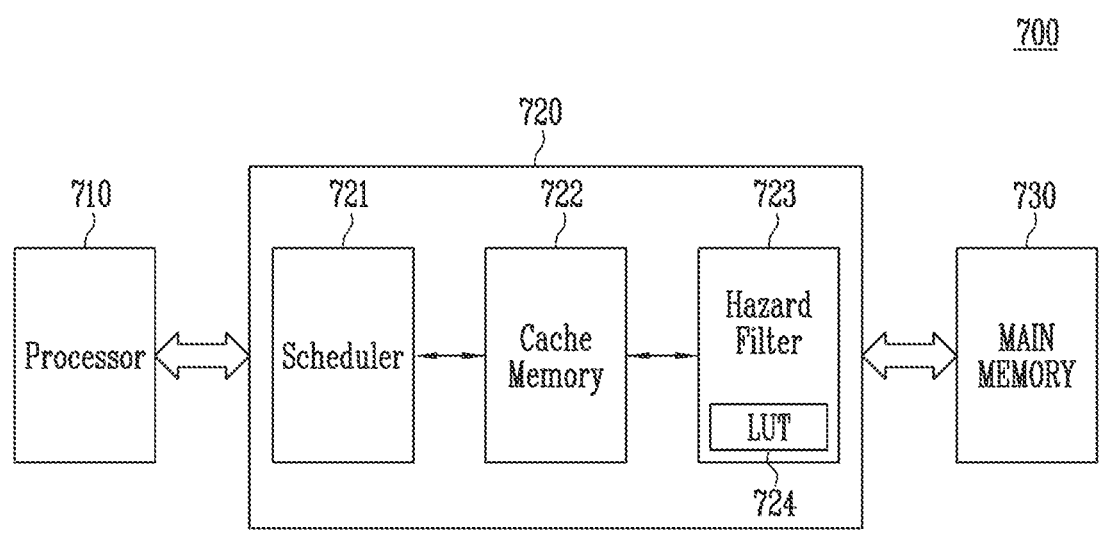
FIG. 8 is a diagram for describing a structure of a memory controller according to another embodiment of the present disclosure.

FIG. 8 is a diagram for describing a structure of a memory controller 700 according to an embodiment of the present disclosure.

Referring to FIG. 8, the memory controller 700 may include a processor 710, a cache controller 720, and a main memory 730.

The processor 710 and the main memory 730 may be configured and operate identically to the processors 210 and 410 and the main memories 230 and 430, respectively, described with reference to FIGS. 1 and 6.

The cache controller 720 may include a scheduler 721, a cache memory 722, and a hazard filter 723.

The scheduler 721 may store access requests input from the processor 710, and addresses corresponding to the access requests. The scheduler 721 may provide an input access request to the cache memory 722 or receive a completion response for the provided access request.

The scheduler 721 may receive at least the access request and an address to be accessed, from the processor 710. When the access request received from the processor 710 is a write request, the scheduler 721 may receive the write request, a write address, and write data. The scheduler 721 may transfer the write request, the write address, and the write data to the cache memory 722. The write data may be provided to the hazard filter 723 through the cache memory 722.

When the access request received from the processor 710 is a read request, the scheduler 721 may receive the read request and a read address. The scheduler 721 may transfer the read request and the read address to the cache memory 722. When data corresponding to the read address has been cached in a cache line corresponding to the read address (cache hit), the cache memory 722 may provide the cached data to the scheduler 721. The scheduler 721 may transfer the received data to the processor 710. When the data corresponding to the read address has not been cached in the cache line corresponding to the read address (cache miss), the cache memory 722 may provide the read request and the read address to the main memory 730. The main memory 730 may provide read data stored in an area corresponding to the read address to the cache controller 720. The read data may be stored in the cache line corresponding to the read address in the cache memory 722 (caching). The read data may be transferred to the processor 710 through the scheduler 721.

When a read request for an address is input before a write request for the address corresponding to the same cache line as the read request is completed, data stored in the cache memory 722 may be previous data that is different from write data recently stored in the main memory 730 in response to the write request. In this case, when data corresponding to the read request has been cached in the cache memory 722, the cache hit may occur, and thus the previous data stored in the cache memory 722 that is different from the most recent write data may be provided to the processor 710 (hazard occurrence).

In order to prevent the hazard occurrence, when cache lines respectively corresponding to addresses of the input access requests collide, that is, access requests for an address corresponding to the same cache line are sequentially input, the scheduler 721 may hold a later input access request without transferring the later input access request to the cache memory 722 until a first input access request is processed.

For example, it is assumed that the first input access request is a write request and the later input access request is a read request, the first input access request and the later input access request being for an address corresponding to the same cache line. In this case, the scheduler 721 may hold the read request without transferring the read request to the cache memory 722 until the write request is completed in the main memory 730.

The hazard filter 723 may receive the write request, a write address, and write data that have passed through the scheduler 721 and the cache memory 722, and store the write request and/or the write address in an internal lookup table LUT. Thereafter, the hazard filter 723 may provide the write request, the write address, and the write data to the main memory 730. In an embodiment, when the write request is received from the cache memory 722 or the write request is provided to the main memory 730, the hazard filter 723 may provide a pre-write completion response to the scheduler 721 before receiving a write completion response from the main memory 730.

The scheduler 721 may provide the read request held or pended by the scheduler 721 and a read address to the cache memory 722 after receiving the pre-write completion response from the hazard filter 723. When the cache miss for the read request occurs in the cache memory 722, the hazard filter 723 may receive the read request. The hazard filter 723 may check whether a write request for the same address as the read address is included in the internal lookup table LUT.

When the write request for the same address as the read address or the same address is stored in the internal lookup table LUT, the hazard filter 723 may hold the read request until the write completion response is received from the main memory 730. When the write request for the same address as the read address is not stored in the internal lookup table LUT, the hazard filter 723 may provide the read request to the main memory 730.

That is, the hazard filter 723 may issue the pre-write completion response for the write request to the scheduler 721 before receiving the write completion response from the main memory 730, and process a hazard situation that may occur later. Therefore, the read delay may be improved.

Figure 9:
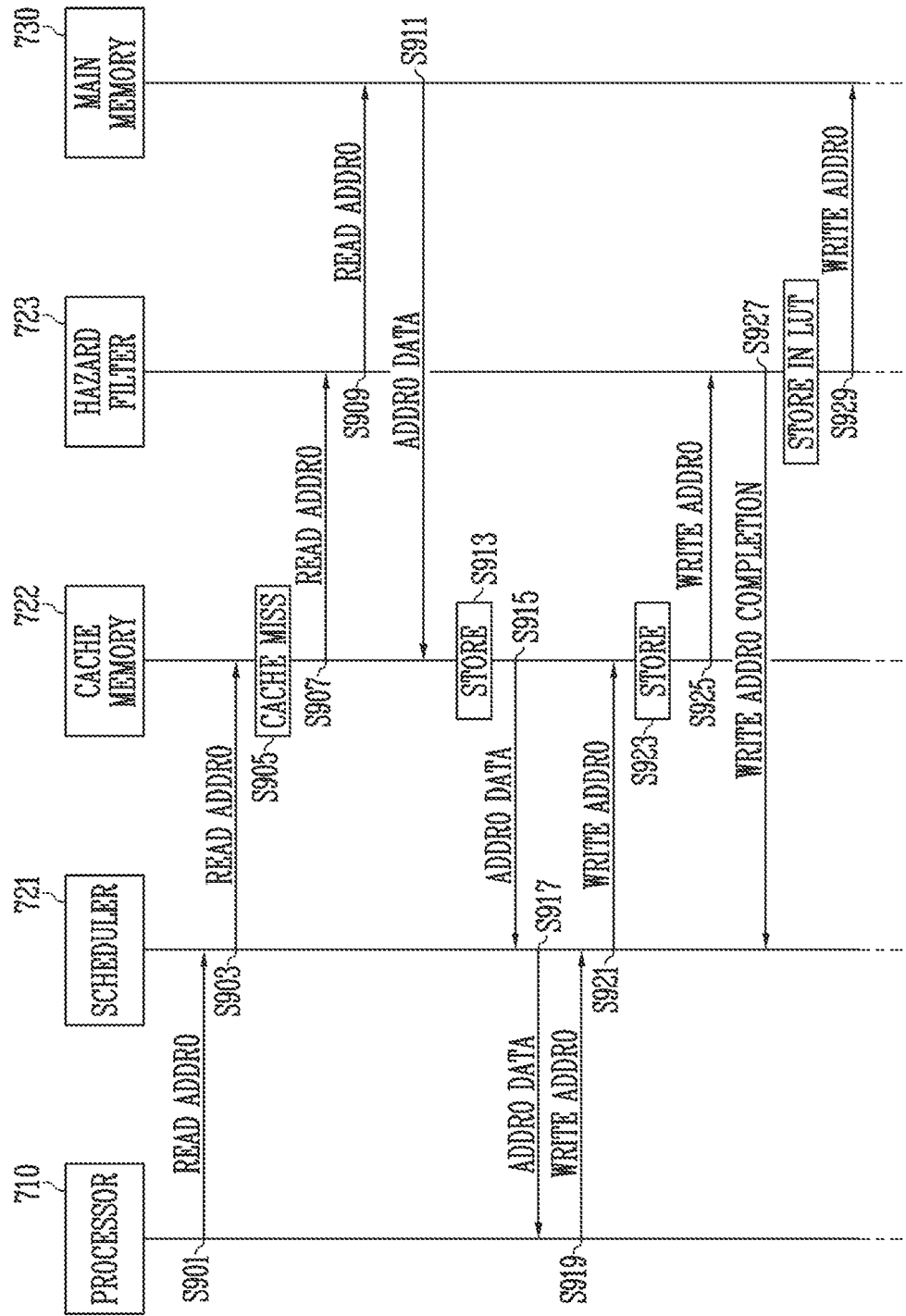
FIGS. 9 and 10 are flowcharts for describing an operation of the memory controller described with reference to FIG. 8.
Figure 10:
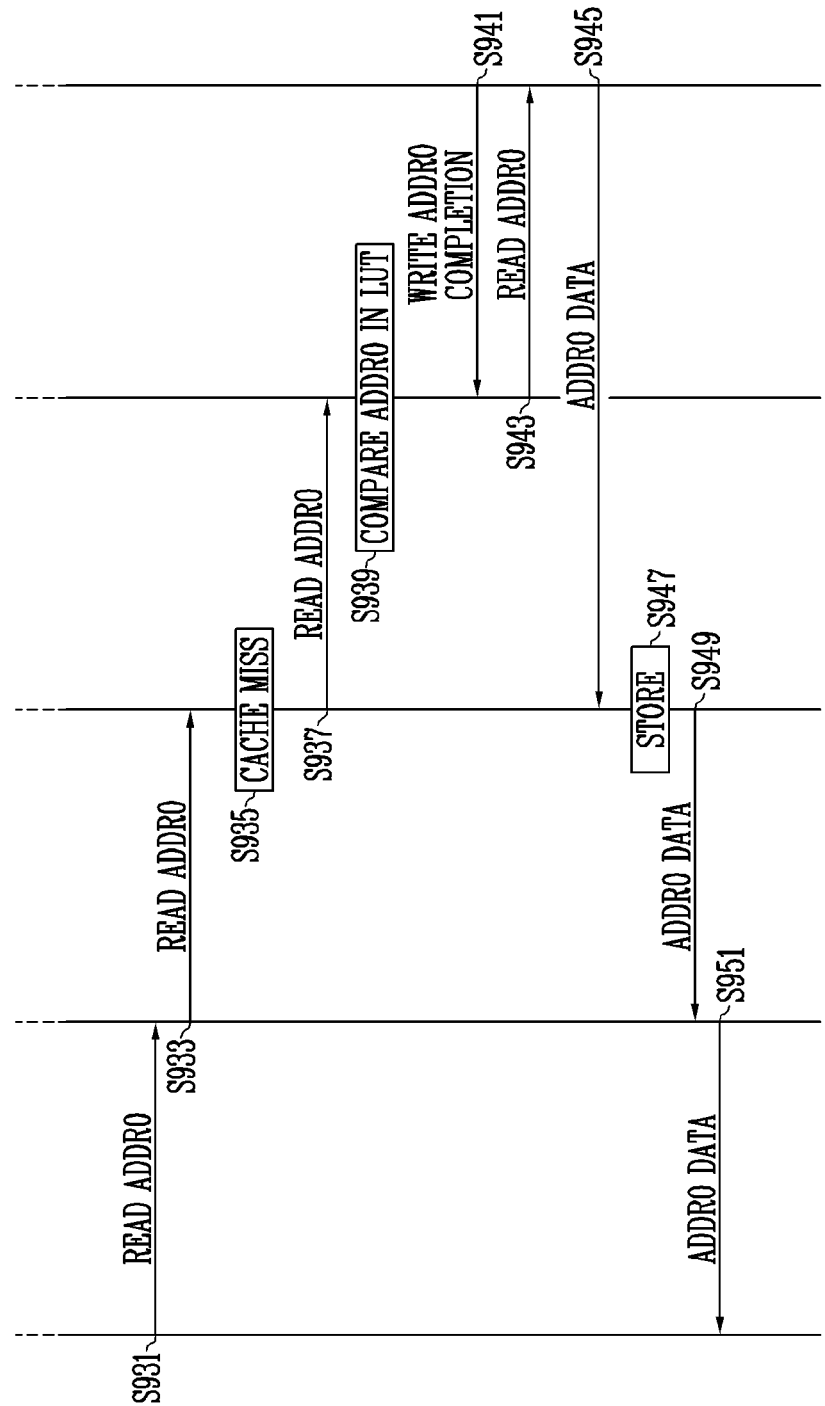

FIGS. 9 and 10 are flowcharts for describing an operation of the memory controller 700 of FIG. 8.

Referring to FIGS. 9 and 10, in step S901, the processor 710 may provide a read request for an address ADDR0 to the scheduler 721.

In step S903, the scheduler 721 may store the read request for the address ADDR0. When there is no preceding read or write request for the address ADDR0, the scheduler 721 may provide the read request for the address ADDR0 to the cache memory 722.

In step S905, the cache memory 722 may check whether data corresponding to the address ADDR0 has been cached in the cache memory 722. When the data corresponding to the address ADDR0 has not been cached in the cache memory 722, the cache miss may occur.

When the cache miss occurs, in step S907, the cache memory 722 may provide the read request for the address ADDR0 to the hazard filter 723.

In step S909, the hazard filter 723 may transfer the read request for the address ADDR0 to the main memory 730.

In step S911, the main memory 730 may read out data corresponding to the address ADDR0, i.e., ADDR0 DATA, and provide the read data ADDR0 DATA to the cache memory 722.

In step S913, the cache memory 722 may store the read data ADDR0 DATA in the cache memory 722 (caching).

In step S915, the cache memory 722 may provide the read data ADDR0 DATA to the scheduler 721. In step S917, the scheduler 721 may provide the read data ADDR0 DATA to the processor 710.

In step S919, the processor 710 may provide a write request for the address ADDR0 to the scheduler 721.

In step S921, the scheduler 721 may provide the write request for the address ADDR0 to the cache memory 722.

In step S923, the cache memory 722 may store write data in the cache memory 722. In another embodiment, the write data may not be stored in the cache memory 722, and an indication that data cached in a cache line corresponding to the address ADDR0 is dirty data may be stored in the cache memory 722.

In step S925, the cache memory 722 may provide the write request for the address ADDR0 to the hazard filter 723.

In step S927, the hazard filter 723 may provide a pre-write completion response to the scheduler 721. In addition, the write address ADDR0 may be stored in an internal lookup table of the hazard filter 723.

In step S929, the hazard filter 723 may provide the write request to the main memory 730.

While the write request is performed in the main memory 730, in step S931, the processor 710 may provide another read request for the address ADDR0 to the scheduler 721.

In step S933, since the scheduler 721 already received the pre-write request completion response for the address ADDR0, which is the same address as the address ADDR0 for the other read request, from the hazard filter 723, the scheduler 721 may provide the other read request for the address ADDR0 to the cache memory 722.

In step S935, the cache memory 722 may check whether data corresponding to the address ADDR0 has been cached in the cache memory 722. When the data corresponding to the address ADDR0 has not been cached in the cache memory 722, the cache miss may occur.

When the cache miss occurs, in step S937, the cache memory 722 may provide the other read request for the address ADDR0 to the hazard filter 723.

In step S939, the hazard filter 723 may determine whether the write request for the same address as the other read request is stored in the internal lookup table LUT. As a result of the determination, when the write request for the same address as the other read request is stored in the internal lookup table LUT and a write completion response to the write request has not been yet received, the other read request for the address ADDR0 may be held or pended in the hazard filter 723.

In step S941, the main memory 730 may provide the write completion response to the hazard filter 723. Although not shown, the hazard filter 723 may remove information on the write request, e.g., the write request or the address corresponding to the write request, from the lookup table LUT when the write completion response is received from the main memory 730.

In step S943, the hazard filter 723 may provide the other read request for the address ADDR0 to the main memory 730.

In step S945, the main memory 730 may read out read data corresponding to the address ADDR0, i.e., ADDR0 DATA, and provide the read data ADDR0 DATA to the cache memory 722.

In step S947, the cache memory 722 may store the read data ADDR0 DATA in the cache memory 722 (caching).

In step S949, the cache memory 722 may provide the read data ADDR0 DATA to the scheduler 721. In step S951, the scheduler 721 may provide the read data ADDR0 DATA to the processor 710.

In an embodiment, when the processor 710 provides a read request following a write request to the cache controller 720, if the write request is not for the same address as the read request and thus a write request for the same address as the read request is not stored in the internal lookup table LUT, the hazard filter 723 may provide the read request to the main memory 730 without waiting for a write request completion response.

According to the above-described operations in the cache controller 720, a read delay may be reduced, and thus a processing speed of the processor 410 may be fast.

Figure 11:
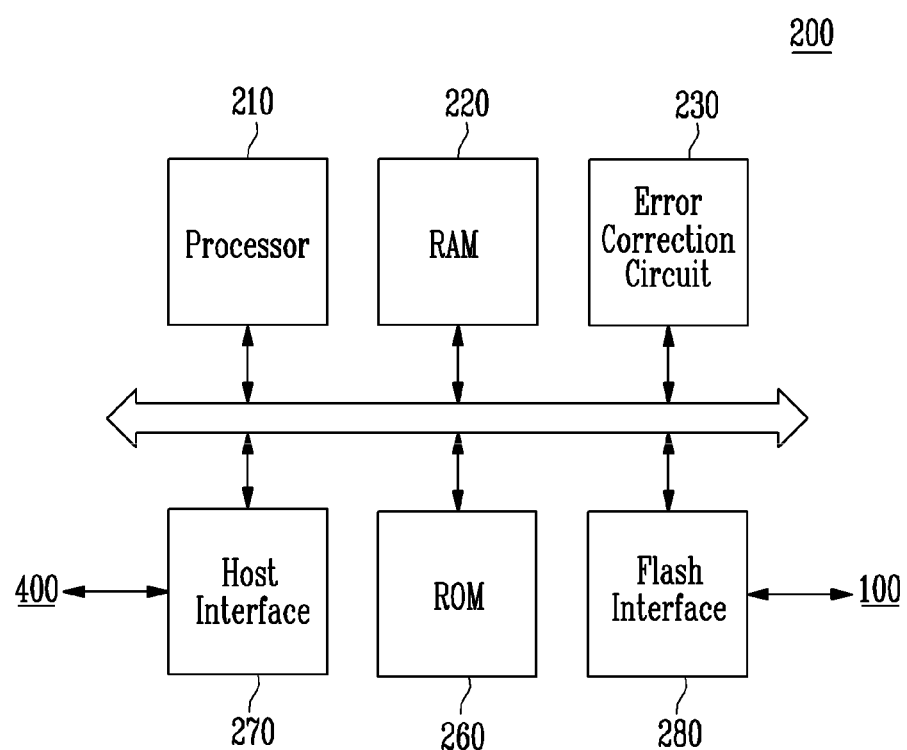
FIG. 11 is a diagram illustrating an embodiment of the memory controller of FIG. 1.

FIG. 11 is a diagram illustrating the memory controller 200 of FIG. 1 according to an embodiment.

Referring to FIGS. 1 and 11, the memory controller 200 may include a processor 210, a RAM 220, an error correction circuit 230, a ROM 260, a host interface 270, and a flash interface 280.

The processor 210 may control overall operations of the memory controller 200. The RAM 220 may be used as a buffer memory, a cache memory, and an operation memory of the memory controller 200. For example, the cache memory 220 described with reference to FIG. 1 may be the RAM 220. In an embodiment, the RAM 220 may be an SRAM.

The ROM 260 may store various information required for an operation of the memory controller 200 in a firmware form.

The memory controller 200 may communicate with an external device (for example, the host 500, an application processor, or the like) through the host interface 270.

The memory controller 200 may communicate with the memory device 100 through the flash interface 280. The memory controller 200 may transmit a command CMD, an address ADDR, and a control signal CTRL to the memory device 100 through the flash interface 280 and receive data DATA read out of the memory device 100. For example, the flash interface 280 may include a NAND interface.

Figure 12:
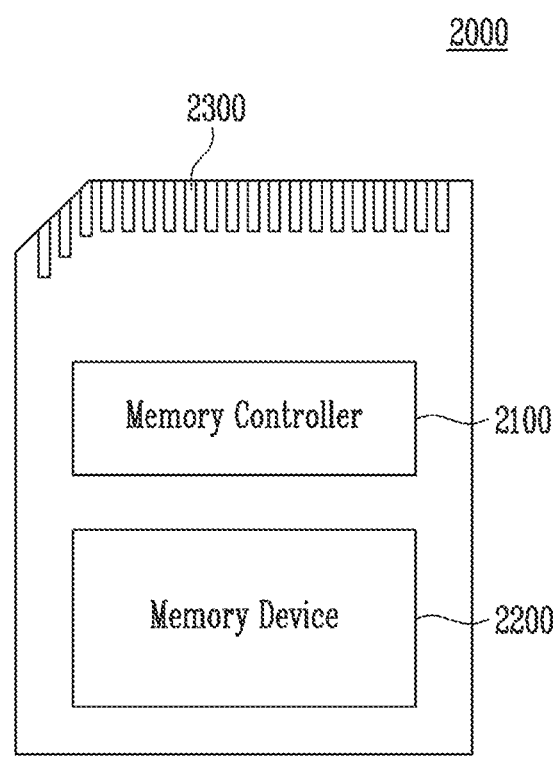
FIG. 12 is a block diagram illustrating a memory card system to which the storage device according to an embodiment of the present disclosure is applied.

FIG. 12 is a block diagram illustrating a memory card system 2000 to which the storage device according to an embodiment of the present disclosure is applied.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host (not shown). The memory controller 2100 is configured to drive firmware for controlling the memory device 2200. The memory controller 2100 may be implemented with the memory controller 200 described with reference to FIG. 1.

For example, the memory controller 2100 may include components such as a random access memory (RAM), a processor, a host interface, a memory interface, an error corrector, and so on.

The memory controller 2100 may communicate with an external device, e.g., the host, through the connector 2300. The memory controller 2100 may communicate with the external device according to a specific communication standard. For example, the memory controller 2100 is configured to communicate with the external device according to at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on. For example, the connector 2300 may be defined by at least one of the various communication standards described above.

For example, the memory device 2200 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), a spin-torque magnetic RAM (STT-MRAM), and so on.

The memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), a universal flash storage (UFS), or the like.

Figure 13:
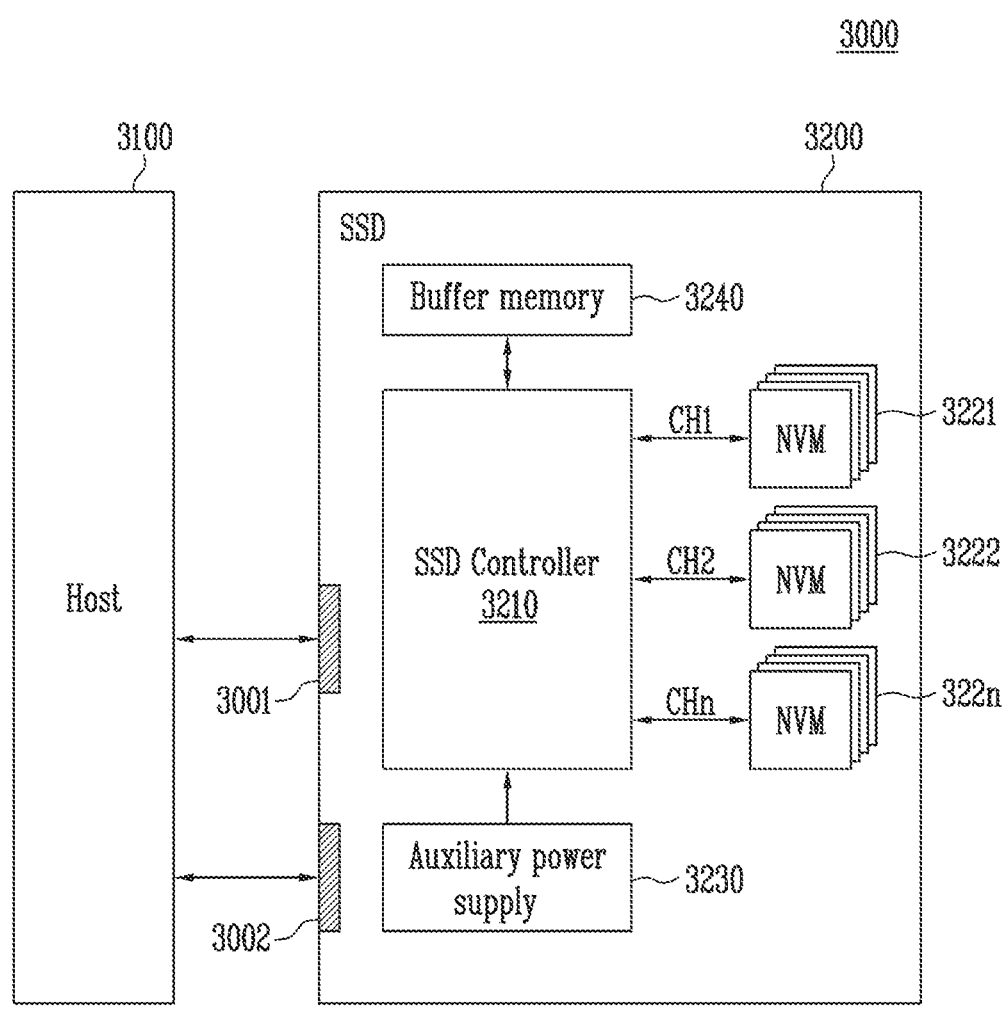
FIG. 13 is a block diagram illustrating a solid state drive (SSD) system to which the storage device according to an embodiment of the present disclosure is applied.

FIG. 13 is a block diagram illustrating a solid state drive (SSD) system 3000 to which the storage device according to an embodiment of the present disclosure is applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interface standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on.

The auxiliary power device 3230 is connected to the host 3100 through the power connector 3002. The auxiliary power device 3230 may receive the power PWR from the host 3100 and may charge the power PWR therein. The auxiliary power device 3230 may provide auxiliary power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide the auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) for the flash memories 3221 to 322n. The buffer memory 3240 may include a volatile memory such as a DRAM, an SDRAM, a DDR SDRAM, an LPDDR SDRAM, a GRAM, or the like, or a non-volatile memory such as an FRAM, a ReRAM, an STT-MRAM, a PRAM, or the like.

Figure 14:
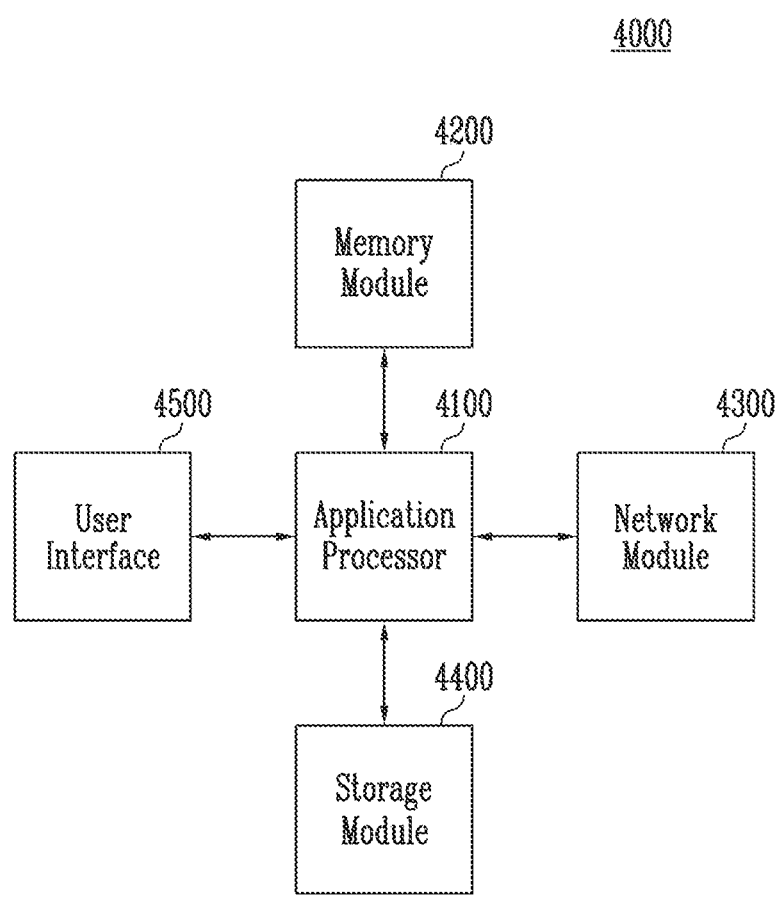
FIG. 14 is a block diagram illustrating a user system to which the storage device according to an embodiment of the present disclosure is applied.

FIG. 14 is a block diagram illustrating a user system 4000 to which the storage device according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, an LPDDR3 SDRAM, or the like, or a non-volatile random access memory, such as a PRAM, a ReRAM, an MRAM, an FRAM, or the like. For example, the application processor 4100 and the memory module 4200 may be packaged based on a package on package (POP) and provided as one semiconductor device.

The network module 4300 may communicate with external devices. For example, the network module 4300 may support wireless communications such as code division multiple access (CDMA), global system for mobile communications (GSM), wideband CDMA (WCDMA), CDMA-2000, time division multiple access (TDMA), long term evolution, Wimax, WLAN, UWB, Bluetooth, Wi-Fi, and so on. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, a three-dimensional NAND flash, or the like. For example, the storage module 4400 may be provided as a removable storage device (removable drive), such as a memory card, or an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 4500 may include one or more of user output interfaces such as a liquid crystal display (LCD), an organic light emitting diode (OLED) display device, an active matrix OLED (AMO-LED) display device, an LED, a speaker, a monitor, and so on.

Hereinafter, other embodiments of the storage device 50 will be described.

Parallel Map Update Based on Scheduler

The disclosure in U.S. patent application Ser. No. 16/887, 520, is incorporated herein by reference in its entirety.

In an embodiment, the memory controller 200 of FIG. 1 may include a scheduler including a read modified write (RMW) processing engine and an out-of-order scheduling engine, so that resources may be fully utilized and the overall execution time may be reduced.

Figure 15:
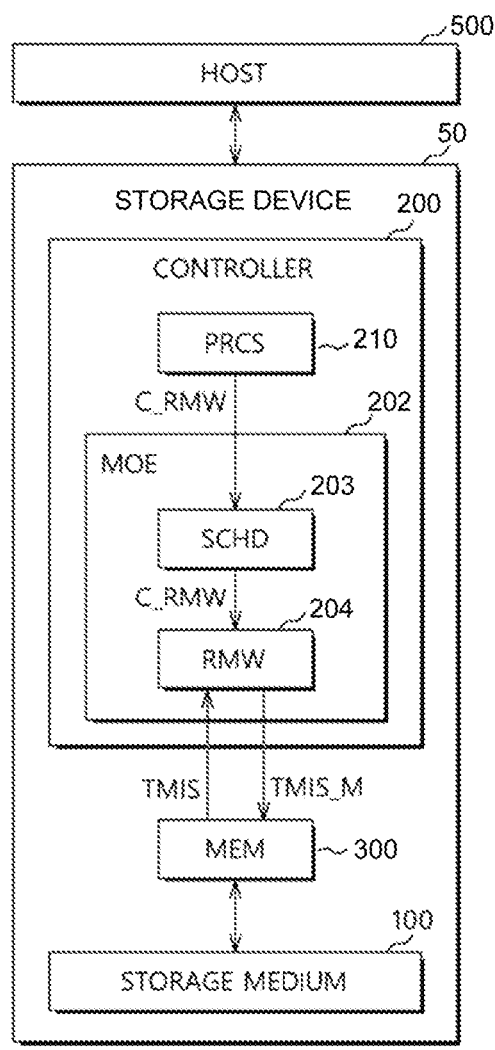
FIG. 15 is a diagram illustrating a memory system in accordance with an embodiment.

FIG. 15 is a diagram illustrating a storage device 50 in accordance with an embodiment, which is similar to FIG. 1 of U.S. patent application Ser. No. 16/887,520.

The storage device 50 may be configured to store, in response to a write request from an external host, e.g., a host 500, data provided from the host 500. Also, the storage device 50 may be configured to provide, in response to a read request from the host 500, data stored therein to the host 500.

The storage device 50 may be configured as a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) or the like.

The storage device 50 may include a controller 200, a main memory (MEM) 300, and a storage medium 100. The controller 200, the main memory 300, and the storage medium 100 may respectively correspond to the memory controller 200, the main memory 300, and the memory device 100 shown in FIG. 1.

The controller 200 may control general operation of the storage device 50. The controller 200 may control the storage medium 100 in order to perform a foreground operation in response to a request from the host 500. The foreground operation may include an operation of writing data in the storage medium 100 and reading data from the storage medium 100 in response to a request (e.g., a write request or a read request) from the host 500.

The controller 200 may control the storage medium 100 in order to perform a background operation internally necessary and independent of the host 500. The background operation may include a wear leveling operation, a garbage collection operation, an erase operation, a read reclaim operation, a refresh operation and so forth on the storage medium 100. Like the foreground operation, the background operation may include an operation of writing data in the storage medium 100 and reading data from the storage medium 100.

The controller 200 may include a processor (PRCS) 210 and a memory operation execution unit (MOE) 202. The processor (PRCS) 210 may be referred to as a command generator and the memory operation execution unit (MOE) 202 may be referred to as a command executor.

The processor 210 may control overall operation of the controller 200. The processor 210 may be implemented by a central processing unit, a microprocessor, a microcontroller, or any combination thereof. Although FIG. 15 exemplifies that the storage device 50 includes one processor, the storage device 50 may include a plurality of processors for high-speed operation.

In accordance with an embodiment, the processor 210 may direct the memory operation execution unit 202 to perform a READ-MODIFY-WRITE (RMW) operation on the main memory 300.

Specifically, the processor 210 may provide an RMW command C_RMW to the memory operation execution unit 202 in order to direct the memory operation execution unit 202 to perform an RMW operation.

The RMW command C_RMW may include a target segment address (information thereof), a modification location, and a modification mode. The target segment address may indicate a target management information piece TMIS to be read from the main memory 300 to the memory operation execution unit 202. The target management information piece TMIS may include a value to be modified by the memory operation execution unit 202. The modification location may indicate a location of a value to be modified within the target management information piece TMIS. The modification mode may indicate a particular modification method, for example, bit clear, bit set, count increase, or count decrease.

That is, when it is required to modify a value stored in the main memory 300 through the RMW scheme according to operation characteristics of the processor 210 and the main memory 300, the processor 210 may first provide a read command of the RMW operation to the main memory 300 in order to directly perform the RMW operation. Then, the processor 210 may be in a stall state until receiving the target management information piece TMIS from the main memory 300. Further, since the RMW operation is performed in order to modify management information stored in the main memory 300 and most of such RMW operation is a background operation, the RMW operation may be high overhead to the processor 210. In accordance with an embodiment, the processor 210 may entrust the memory operation execution unit 202 with performing of the RMW operation through the RMW command C_RMW and thus the overhead of the RMW operation with respect to the processor 210 may be eliminated or reduced and thus the performance of the storage device 50 may be drastically improved.

The memory operation execution unit 202 may receive the RMW command C_RMW from the processor 210 and schedule the received RMW command C_RMW to perform the RMW operation to the main memory 300. When receiving the RMW command C_RMW from the processor 210, the memory operation execution unit 202 may immediately provide the processor 210 with an RMW completion report.

The memory operation execution unit 202 may include a scheduler (SCHD) 203 and an RMW unit (RMW) 204.

The scheduler 203 may receive the RMW command C_RMW from the processor 210 and may determine an execution order of the RMW command C_RMW based on the target segment address included in the RMW command C_RMW. Also, the scheduler 203 may control the RMW unit 204 to execute the RMW command C_RMW according to the execution order.

Specifically, the scheduler 203 may receive, when a first RMW command is pending, a second RMW command having address dependency to the first RMW command and a third RMW command not having address dependency to the first RMW command. An RMW command having address dependency to a previous RMW command may have the same target segment address as the previous RMW command.

In the above example, the scheduler 203 may control the RMW unit 204 to execute the third RMW command prior to the second RMW command. Also, the scheduler 203 may control the RMW unit 204 to execute the second RMW command after completing execution of the first RMW command. The execution completion of the first RMW command may mean completion of writing the target management information piece TMIS, which is modified according to the first RMW command, into the main memory 300.

As described below, the second RMW command having address dependency to the first RMW command should not be executed in parallel with the first RMW command and should be executed after the execution completion of the first RMW command, in order to ensure data integrity. On the other hand, the third RMW command not having address dependency to the first RMW command may be executed regardless of the execution of the first RMW command and may be executed even in parallel with the first RMW command. Therefore, according to an embodiment, the scheduler 203 may re-order the RMW commands C_RMW, which are received from the processor 210 and pending, to be processed out-of-order. Eventually, resources may be fully utilized without any pending status and overall execution time may be reduced.

The RMW unit 204 may perform an RMW operation to the main memory 300 based on the RMW command C_RMW under the control of the scheduler 203. The RMW unit 204 may perform the RMW operation based on the target segment address, the modification location and the modification mode included in the RMW command C_RMW.

In detail, the RMW unit 204 may read a target management information piece TMIS, which corresponds to the target segment address, from the main memory 300. The RMW unit 204 may modify a value, which corresponds to the modification location within the target management information piece TMIS, according to the modification mode. The RMW unit 204 may write a modified target management information piece TMIS_M, which includes the modified value, into the main memory 300.

The main memory 300 may be utilized as an operation memory for the processor 210. The main memory 300 may be configured to store a software program, which is to be executed by the processor 210, and various kinds of management data of the storage medium 100, which is managed by the processor 210. The management data may be referred to as 'meta data.'

According to an embodiment, the main memory 300 may be configured to temporarily store, as a buffer, data that is transferred between the host 500 and the storage medium 100. According to an embodiment, the main memory 300 may be configured to cache, as a cache, data stored in the storage medium 100.

The main memory 300 may include one or more volatile memory devices. The volatile memory devices may include a Static Random Access Memory (SRAM), a Dynamic Random Access Memory (DRAM), and the like.

The storage medium 100 may store therein data transferred from the controller 200 under the control of the controller 200. The storage medium 100 may read data therefrom and provide the read data to the controller 200 under the control of the controller 200.

The storage medium 100 may include one or more nonvolatile memory devices. The nonvolatile memory devices may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Figure 16:
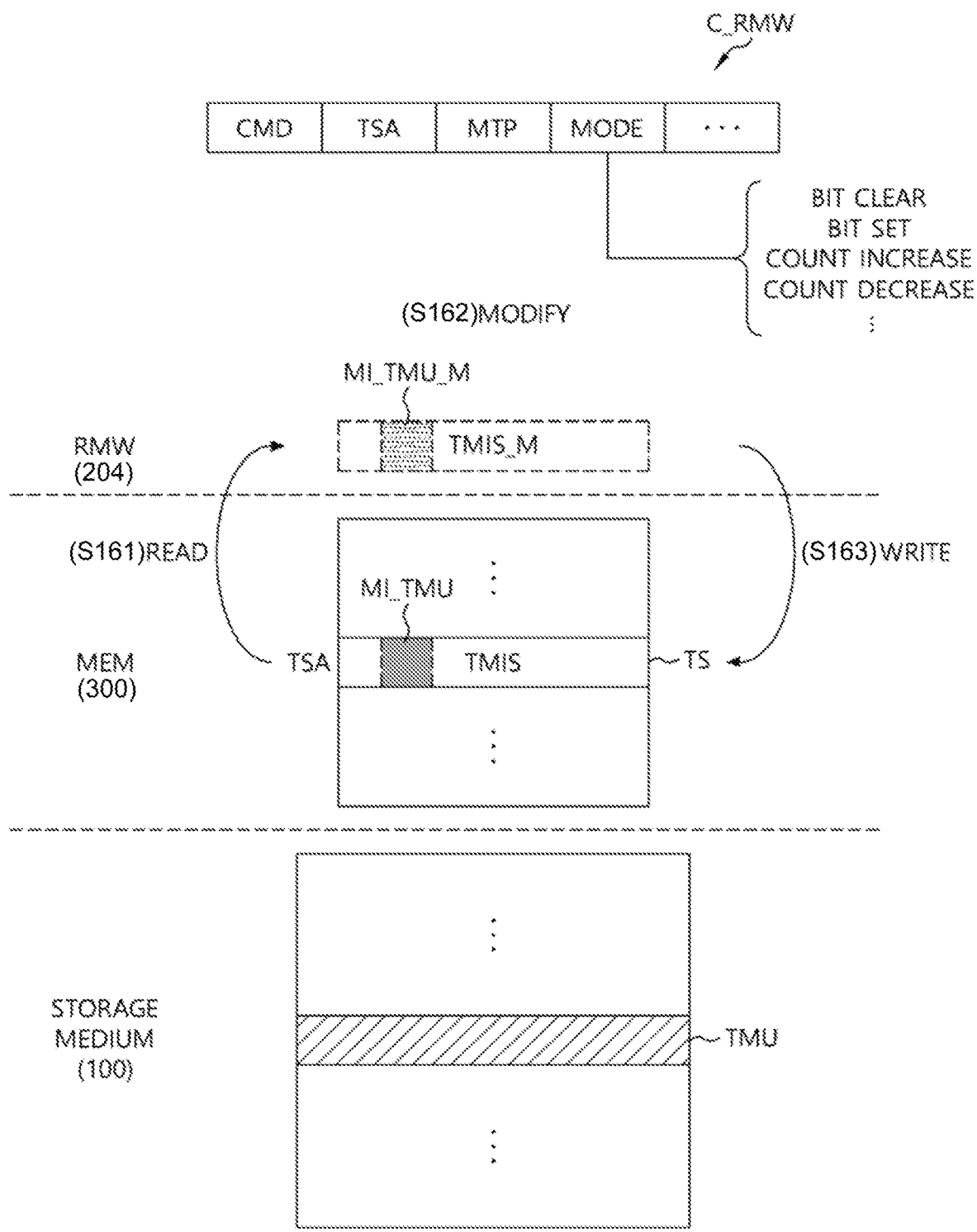
FIG. 16 is a diagram illustrating a method in which a Read-Modify-Write (RMW) unit, such as that of FIG. 1, performs a RMW operation on a memory device in accordance with an embodiment.

FIG. 16 is a diagram illustrating a method in which the RMW unit 204 of FIG. 15 performs an RMW operation on the main memory 300 in accordance with an embodiment, which is similar to FIG. 3 of U.S. patent application Ser. No. 16/887,520.

Referring to FIG. 16, an event may occur, in response to which management information MI_TMU on a target memory unit TMU within the storage medium 100 is required to be modified. For example, data stored in the target memory unit TMU may become invalid. For example, valid data may be stored in the target memory unit TMU that is empty. For example, a read operation or an erase operation may be performed on the target memory unit TMU.

In response to occurrence of an event on the target memory unit TMU, the processor 210 may generate a RMW command C_RMW and provide the RMW command C_RMW to the memory operation execution unit 202 in order to modify management information MI_TMU of the target memory unit TMU.

The RMW command C_RMW may include a control command CMD indicative of the RMW command C_RMW and information of a target segment address TSA, a modification location MTP, and a modification mode MODE.

The target segment address TSA may correspond to the target management information piece TMIS to be read from the main memory 300 to the RMW unit 204. The target segment address TSA may correspond to a target segment TS, in which the target management information piece TMIS is stored. The modification location MTP may mean a location of the management information MI_TMU to be modified within the target management information piece TMIS. The modification mode MODE may indicate a particular modification method (for example, bit clear, bit set, count increase, or count decrease) to be performed on the management information MI_TMU of the modification location MTP.

The RMW unit 204 may perform an RMW operation on the target segment address TSA of the main memory 300 based on the RMW command C_RMW.

In detail, the RMW unit 204 may read a target management information piece TMIS from a target segment TS corresponding to a target segment address TSA in step S161.

In step S162, the RMW unit 204 may modify the management information MI_TMU included in the target management information piece TMIS based on the modification location MTP and the modification mode MODE.

For example, the RMW unit 204 may clear, when data stored in the target memory unit TMU becomes invalid, a validity bit within the management information MI_TMU. For example, the RMW unit 204 may set, when valid data is stored into the target memory unit TMU that is empty, a validity bit within the management information MI_TMU. For example, the RMW unit 204 may increase, when a read operation is performed on the target memory unit TMU, a read count within the management information MI_TMU. For example, the RMW unit 204 may increase, when an erase operation is performed on the target memory unit TMU, an erase count within the management information MI_TMU.

In step S163, the RMW unit 204 may write a modified target management information piece TMIS_M, which includes the modified management information MI_TMU_M, into the main memory 300.

For example, the RMW unit 204 may drive, when it operates according to the Advanced eXtensible Interface (AXI) protocol of the Advanced Microcontroller Bus Architecture (AMBA) bus, a write channel and a read channel in parallel. In this case, the RMW unit 204 may perform a write operation and a read operation in parallel on different target segment addresses that do not have address dependency to one another, through the write channel and the read channel. In order for the RMW unit 204 to perform such operation, the scheduler 203 may re-order a plurality of RMW commands to be processed out-of-order based on target segment addresses of the RMW commands, which is described with reference to FIG. 17.

Figure 17:
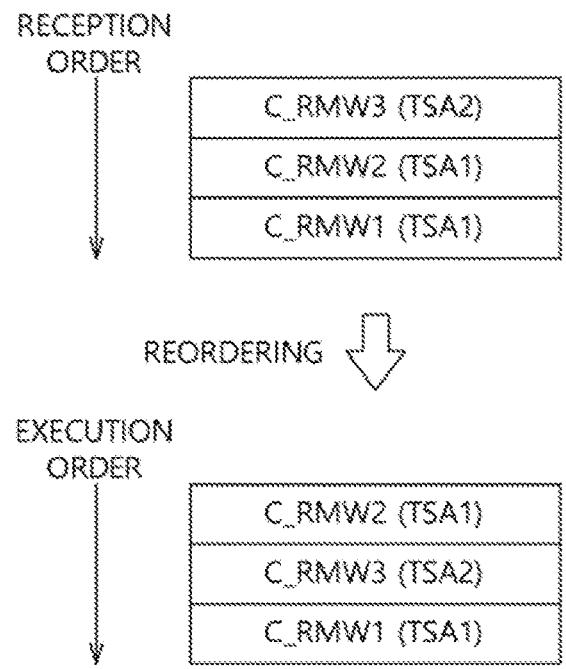
FIG. 17 is a diagram exemplarily illustrating a re-ordering method of a scheduler, such as that of FIG. 1, in accordance with an embodiment.

FIG. 17 is a diagram exemplarily illustrating a re-ordering method of the scheduler 203 of FIG. 15 in accordance with an embodiment, which is similar to FIG. 4 of U.S. patent application Ser. No. 16/887,520.

Referring to FIG. 17, the scheduler 203 may sequentially receive first to third RMW commands C_RMW1 to C_RMW3 from the processor 210. The scheduler 203 may determine an execution order of the first to third RMW commands C_RMW1 to C_RMW3 and may control the RMW unit 204 to execute the first to third RMW commands C_RMW1 to C_RMW3 according to the execution order.

In detail, the scheduler 203 may determine the execution order according to the dependency of the target segment addresses included in the first to third RMW commands C_RMW1 to C_RMW3.

For example, the second RMW command C_RMW2 may be associated with the same target segment address TSA1 as the first RMW command C_RMW1 and thus may have address dependency to the first RMW command C_RMW1. Therefore, the second RMW command C_RMW2 should be executed after the execution completion of a RMW operation in respond to the first RMW command C_RMW1, in order to ensure integrity of data of the target segment address TSA1. Therefore, the second RMW command C_RMW2 should not be executed in parallel with the first RMW command C_RMW1.

On the other hand, the third RMW command C_RMW3 may be associated with target segment address TSA2 and thus may not have address dependency to the first RMW command C_RMW1. Therefore, the third RMW command C_RMW3 may be executed independently of the first RMW command C_RMW1 and regardless of whether or not execution of the first RMW command C_RMW1 is completed. The third RMW command C_RMW3 may be executed in parallel with the first RMW command C_RMW1.

Therefore, the scheduler 203 may determine the execution order such that the third RMW command C_RMW3 is to be executed prior to the second RMW command C_RMW2. As described with reference to FIG. 18A, the scheduler 203 may control the RMW unit 204 to execute the third RMW command C_RMW3 partially in parallel with the first RMW command C_RMW1 and execute the second RMW command C_RMW2 after the first RMW command C_RMW1 is executed.

Figure 18A:
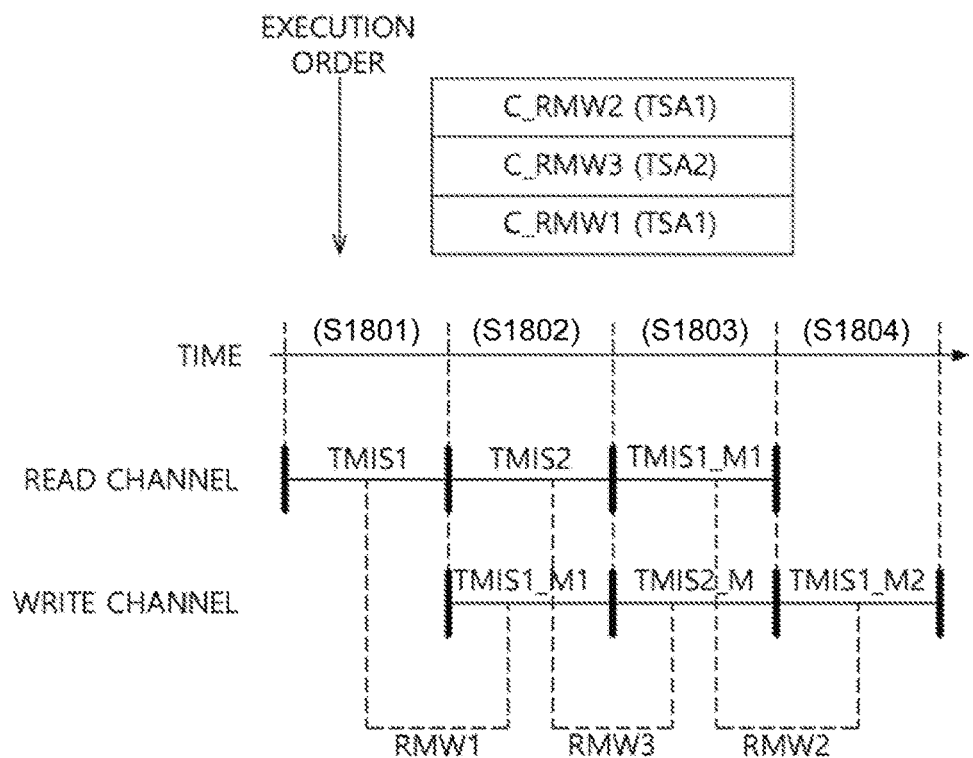
FIG. 18A is a diagram illustrating a method in which a RMW unit executes RMW commands according to a re-ordered execution order in accordance with an embodiment.
Figure 18B:
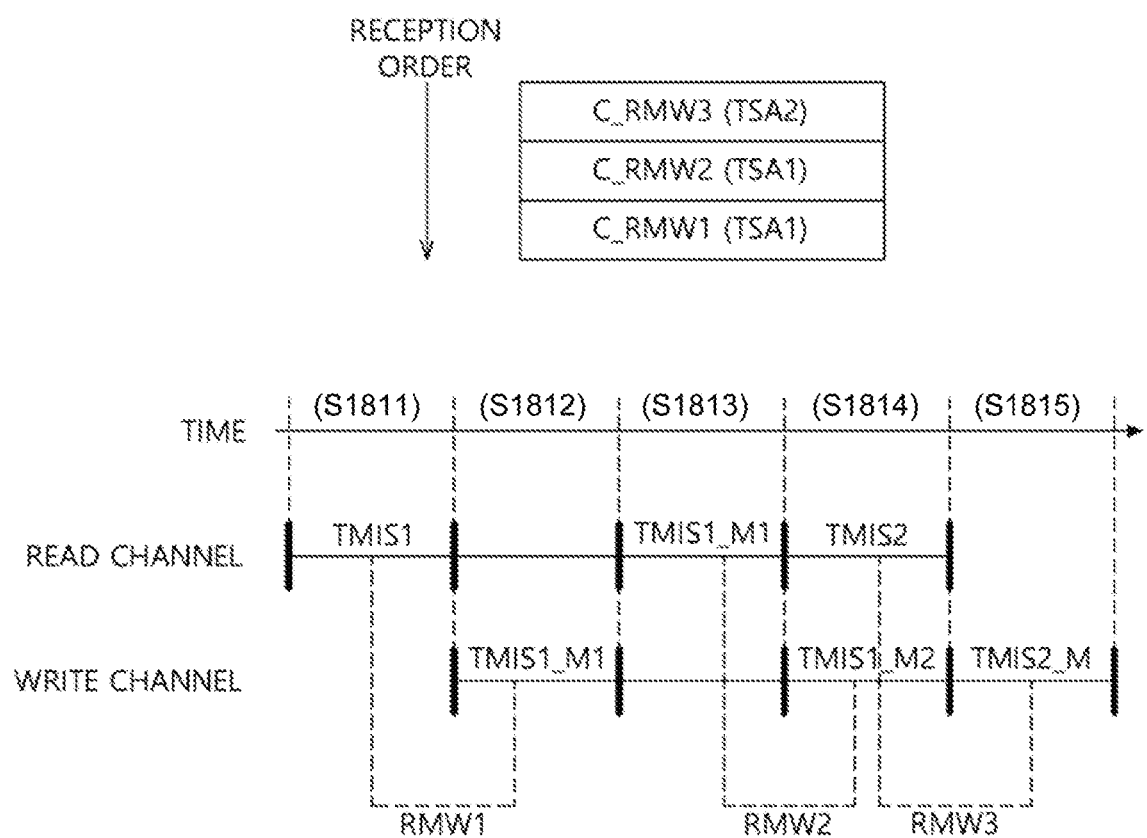
FIG. 18B is a diagram illustrating a method in which a RMW unit executes RMW commands according to a reception order for comparing with the method of FIG. 18A.

FIG. 18A is a diagram illustrating a method in which the RMW unit 204 executes RMW commands C_RMW1 to C_RMW3 according to a re-ordered execution order in accordance with an embodiment, which is similar to FIG. 5A of U.S. patent application Ser. No. 16/887,520. FIG. 18B is a diagram illustrating a method in which the RMW unit 204 executes the RMW commands C_RMW1 to C_RMW3 according to a reception order for comparison with the method of FIG. 18A, which is similar to FIG. 5B of U.S. patent application Ser. No. 16/887,520.

Referring to FIG. 18A, the RMW unit 204 may execute the first to third RMW commands C_RMW1 to C_RMW3 according to the execution order that is, for example, determined as described with reference to FIG. 17.

In time periods S1801 and S1802, the RMW unit 204 may perform a first RMW operation RMW1 based on the first RMW command C_RMW1.

In detail, in the time period S1801, the RMW unit 204 may read the target management information piece TMIS1 of the first RMW command C_RMW1 from the main memory 300 through a read channel. The target management information piece TMIS1 may correspond to the target segment address TSA1 of the first RMW command C_RMW1. Although not illustrated, the RMW unit 204 may modify management information within the target management information piece TMIS1.

In the time period S1802, the RMW unit 204 may write the modified target management information piece TMIS1_M1 into the main memory 300 through a write channel.

In time periods S1802 and S1803, the RMW unit 204 may perform a third RMW operation RMW3 based on the third RMW command C_RMW3.

In detail, in the time period S1802, the RMW unit 204 may read the target management information piece TMIS2 of the third RMW command C_RMW3 from the main memory 300 through a read channel. The target management information piece TMIS2 may correspond to the target segment address TSA2 of the third RMW command C_RMW3. That is, the RMW unit 204 may perform in parallel the write operation of the first RMW operation RMW1 and the read operation of the third RMW operation RMW3 for the target segment addresses TSA1 and TSA2, which are different from each other, through the write channel and the read channel that are separate from each other. The RMW unit 204 may modify management information within the target management information piece TMIS2.

In the time period S1803, the RMW unit 204 may write the modified target management information piece TMIS2_M into the main memory 300 through the write channel.

In time periods S1803 and S1804, the RMW unit 204 may perform a second RMW operation RMW2 based on the second RMW command C_RMW2.

In detail, in the time period S1803, since the first RMW operation RMW1 is completed and the read channel is available, the RMW unit 204 may read the modified target management information piece TMIS1_M1 of the second RMW command C_RMW2 from the main memory 300 through the read channel. The RMW unit 204 may modify the management information within the modified target management information piece TMIS1_M1.

In the time period S1804, the RMW unit 204 may write the modified target management information piece TMIS1_M2 into the main memory 300 through the write channel.

Referring to FIG. 18B, the RMW unit 204 may execute the first to third RMW commands C_RMW1 to C_RMW3 according to the reception order.

In time periods S1811 and S1812, the RMW unit 204 may perform a first RMW operation RMW1 based on the first RMW command C_RMW1.

In detail, in the time period S1811, the RMW unit 204 may read the target management information piece TMIS1 of the first RMW command C_RMW1 from the main memory 300 through a read channel. The target management information piece TMIS1 may correspond to the target segment address TSA1 of the first RMW command C_RMW1. The RMW unit 204 may modify management information within the target management information piece TMIS1.

In the time period S1812, the RMW unit 204 may write the modified target management information piece TMIS1_M1 into the main memory 300 through a write channel.

After execution completion of the first RMW operation RMW1, in time periods S1813 and S1814, the RMW unit 204 may perform a second RMW operation RMW2 based on the second RMW command C_RMW2.

In detail, in the time period S1813, the RMW unit 204 may read the modified target management information piece TMIS1_M1 of the second RMW command C_RMW2 from the main memory 300 through a read channel. The RMW unit 204 may modify management information within the modified target management information piece TMIS1_M1.

In the time period S1814, the RMW unit 204 may write the modified target management information piece TMIS1_M2 into the main memory 300 through the write channel.

In time periods S1814 and S1815, the RMW unit 204 may perform a third RMW operation RMW3 based on the third RMW command C_RMW3.

In detail, in the time period S1814, since the read channel is available, the RMW unit 204 may read the target management information piece TMIS2 of the third RMW command C_RMW3 from the main memory 300 through the read channel. The target management information piece TMIS2 may correspond to the target segment address TSA2 of the third RMW command C_RMW3. That is, the RMW unit 204 may perform in parallel the write operation of the second RMW operation RMW2 and the read operation of the third RMW operation RMW3 for the target segment addresses TSA1 and TSA2, which are different from each other, through the write channel and the read channel. The RMW unit 204 may modify the management information within the target management information piece TMIS2.

In the time period S1815, the RMW unit 204 may write the modified target management information piece TMIS2_M into the main memory 300 through the write channel.

In summary, comparing the operations of FIGS. 18A and 18B, the overall operation time of the first to third RMW operations RMW1 to RMW3 may be reduced. That is, in accordance with an embodiment, resources may be fully utilized and the overall execution time may be reduced since the scheduler 203 re-orders the plurality of RMW commands to be processed out-of-order.

Asynchronous FTL Meta Data Write

The disclosure in U.S. patent application Ser. No. 17/036,960, is incorporated herein by reference in its entirety.

In an embodiment, when multiple meta slices included in meta data and journal data are written in a memory device, an operation of writing the meta slice and an operation of writing the journal data are controlled to be asynchronously performed to minimize a time taken for an operation of writing meta data in the memory device.

Figure 19:
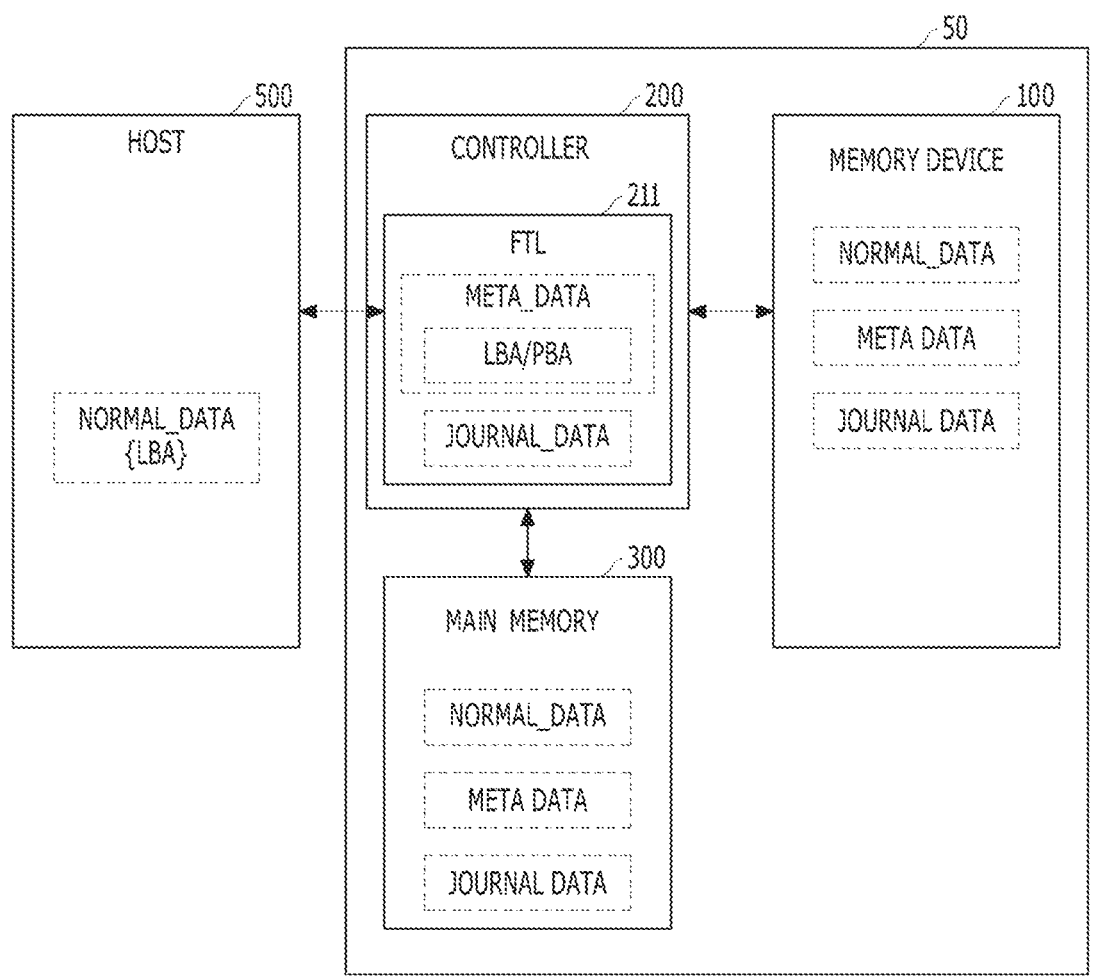
FIG. 19 illustrates a structure of a data processing system including a memory system according to an embodiment.

FIG. 19 illustrates a structure of a data processing system including a storage device 50 according to an embodiment, which is similar to FIG. 1 of U.S. patent application Ser. No. 17/036,960.

Referring to FIG. 19, the data processing system may include a host 500 and a storage device 50, which may interoperate. The host 500 may be a computing device, which may be realized in the form of a mobile device, a computer, or a server. The storage device 500 may receive a command from the host 500 and may store or output data corresponding to the received command. The host 500 and the storage device 500 illustrated in FIG. 19 may correspond to the host 500 and the storage device 50 shown in FIG. 1, respectively.

The storage device 500 may have a storage space which may include nonvolatile memory cells. For example, the storage device 500 may be realized in the form of a flash memory, or a solid-state drive (SSD).

In order to store data requested by the host 500, the storage device 500 may perform a mapping operation that couples a file system used by the host 500 with the storage space including the nonvolatile memory cells. An address of data according to the file system used by the host 500 may be referred to as a logical address or a logical block address. An address of data in the storage space including nonvolatile memory cells may be referred to as a physical address or a physical block address. When the host 500 transmits a logical address together with a write command and write data to the storage device 500, the storage device 500 may search for a storage space for storing the write data, may map a physical address of the searched storage space with the logical address, and may program the write data in the searched storage space. When the host 500 transmits a logical address together with a read command to the storage device 500, the storage device 500 may search for a physical address mapped to the logical address, and may output data stored in the searched physical address, to the host 500.

Specifically, the storage device 500 may include a memory device 100 which does not lose data stored therein although power is turned off, a main memory 300 for temporarily storing data, and a controller 200 for controlling operations of the memory device 100 and the main memory 300. Furthermore, the controller 200 may include a flash translation layer (FTL) unit 211.

More specifically, the host 500 may manage normal data NORMAL_DATA using a logical address LBA. Furthermore, the controller 200 included in the storage device 500 may store, in the memory device 100, the normal data NORMAL_DATA received from the host 500. In this case, the controller 200 may map the logical address LBA, received from the host 500 along with the normal data NORMAL_DATA, to a physical address PBA indicative of a physical space within the memory device 100 in which the normal data NORMAL_DATA is stored.

As described above, the controller 200 may generate meta data META_DATA in accordance with the storage of the normal data NORMAL_DATA through a mapping operation. That is, the controller 200 may generate, as the meta data META_DATA, mapping information LBA/PBA for mapping the logical address LBA of the normal data NORMAL_DATA to the physical address PBA indicative of the physical space within the memory device 100. In this case, a value of the mapping information LBA/PBA included in the meta data META_DATA may also be updated in response to the update of a value of the normal data NORMAL_DATA by the host 500. Furthermore, the controller 200 may store, in the memory device 100, the meta data META_DATA generated therein.

Furthermore, the controller 200 may generate journal data JOURNAL_DATA. The journal data JOURNAL_DATA may be history information for the update contents of the meta data META_DATA. Accordingly, the controller 200 may derive the meta data META_DATA before or after update, based on the journal data JOURNAL_DATA. Furthermore, the controller 200 may store, in the memory device 100, the journal data JOURNAL_DATA generated therein.

Furthermore, the operation of generating the meta data META_DATA by mapping the logical address LBA to the physical address PBA and the operation of generating the journal data JOURNAL_DATA by collecting the history information for the update contents of the meta data META_DATA may be performed by the FTL unit 211 included in the controller 200.

Furthermore, the normal data NORMAL_DATA input and output between the host 500 and the storage device 500 may be temporarily stored in the main memory 1300 separately from the storage of the normal data NORMAL_DATA in the memory device 100. Furthermore, the meta data META_DATA generated by the controller 200 in accordance with the storage of the normal data NORMAL_DATA received from the host 500 may be temporarily stored in the main memory 300 separately from the storage of the meta data META_DATA in the memory device 100. Furthermore, the journal data JOURNAL_DATA generated by the controller 200 in accordance with an operation of updating the meta data META_DATA may be temporarily stored in the main memory 300 separately from the storage of the journal data JOURNAL_DATA in the memory device 100.

For reference, FIG. 19 illustrates that the main memory 300 is outside the controller 200, but this is merely an embodiment. According to another embodiment, the main memory 300 may be included in the controller 200.

FIG. 20 illustrates a structure of meta data in the storage device 500 of FIG. 19 according to an embodiment, which is similar to FIG. 4 of U.S. patent application Ser. No. 17/036,960.

Referring to FIGS. 19 and 20, in the storage device 500, the meta data META_DATA may include logical-physical address mapping information L2P, a valid page table VPT, other information ETC, etc. That is, the meta data META_DATA may include all of the remaining pieces of information and data other than the normal data NORMAL_DATA input/output in accordance with a command received from the host 500.

In this case, the logical-physical address mapping information L2P may be mapping information between a logical address LBA received from the host 500 and a physical address PBA indicative of a physical storage space in which normal data NORMAL_DATA corresponding to the logical address LBA will be stored within the memory device 100. Furthermore, the valid page table VPT may include information on a page in which valid data is stored, among multiple pages included in a memory block. The controller 200 may control a garbage collection operation based on the valid page table VPT. Furthermore, according to an embodiment, the other information ETC may include reliability information (not illustrated). The reliability information may include erase cycle count, read count, etc. for a memory block. The controller 200 may control a read reclaim operation or a wear-leveling operation based on the reliability information.

The controller 200 may split the meta data META_DATA into multiple meta slices META SLICE<1:15> and manage the multiple meta slices META SLICE<1:15>. In this case, each of the multiple meta slices META_SLICE<1:15> may be information corresponding to at least one of multiple pages within a memory block. The sizes of the multiple meta slices META SLICE<1:15> or the number of multiple meta slices META SLICE<1:15> included in the meta data META_DATA may be determined by the type and usage of the memory device 100. According to an embodiment, the meta data META_DATA may be split into the multiple meta slices META SLICE<1:15> based on a value of a logical address. For reference, a "segment" and a "slice" described with reference to FIG. 20 may mean data units having the same size or may mean data units having different sizes. Furthermore, FIG. 20 illustrates that the number of meta slices META_SLICE<1:15> is 15, but this is merely an embodiment. A larger or smaller number of meta slices may be included in meta data.

Specifically, when performing a booting operation, the controller 200 may load, onto the main memory 300, meta data META_DATA stored in the memory device 100, for example, meta data META_DATA including logical-physical address mapping information L2P. Furthermore, when it is necessary to check the mapping information L2P stored in the memory device 100, the controller 200 may read, from the memory device 100, the meta data META_DATA including the mapping information L2P, and may store the read meta data META_DATA in the main memory 300.

The controller 200 may receive a write command, write data, and a logical address LBA from the host 500. The controller 200 may allocate a physical storage space of the memory device 100 in which the write data is to be stored, in response to the write command. That is, the controller 200 may map the logical address LBA to a corresponding physical address PBA in response to the write command. In this case, the physical address PBA may be information for indicating a physical storage space of the memory device 100 in which the write data received from the host 500 is to be stored.

As described above, the controller 200 may map the logical address LBA to the corresponding physical address PBA in response to the write command. In this case, the controller 200 may update meta data META_DATA, including mapping information L2P previously stored in the main memory 300, with meta data META_DATA including newly generated mapping information L2P between the logical address LBA and physical address PBA.

When the update operation is performed, there may be a difference between meta data META_DATA including mapping information L2P stored in the memory device 100 and meta data META_DATA including mapping information L2P stored in the main memory 300. Accordingly, the controller 200 may control the pieces of different mapping information L2P to coincide with each other by flushing, into the memory device 100, the meta data META_DATA including the mapping information L2P stored in the main memory 300. That is, the controller 200 may control the meta data META_DATA, including the mapping information L2P stored in the main memory 300, to coincide with the meta data META_DATA, including the mapping information L2P stored in the memory device 100, through the flush operation. In this case, the controller 200 may perform the flush operation in a meta slice unit. That is, the meta data META_DATA includes the multiple meta slices META_SLICE<1:15>. The controller 200 may select any one updated meta slice of the multiple meta slices META_SLICE<1:15>, and may store the selected meta slice in the memory device 100 by performing the flush operation on the selected meta slice.

More specifically, the controller 200 may classify, as a dirty meta slice, an updated meta slice of the multiple meta slices META_SLICE<1:15> included in the meta data META_DATA. Furthermore, the controller 200 may perform the flush operation on the dirty meta slice among the multiple meta slices META_SLICE<1:15>, that is, an operation of writing the dirty meta slice in the memory device 100. In this case, if there are several dirty meta slices among the multiple meta slices META_SLICE<1:15>, the controller 200 may select any one of the several dirty meta slices, and may perform the flush operation on the selected dirty meta slice. Furthermore, the controller 200 may select the dirty meta slice from among the multiple meta slices META_SLICE<1:15> in a round robin manner, and may perform the flush operation on the selected dirty meta slice.

Furthermore, the controller 200 may generate first state information NEW and second state information OLD corresponding to each of the multiple meta slices META_SLICE<1:15> included in the meta data META DATA. In this case, the first state information NEW and the second state information OLD corresponding to each of the multiple meta slices META_SLICE<1:15> may be stored in the main memory 300 along with the multiple meta slices META_SLICE<1:15>.

Specifically, the controller 200 may classify an updated meta slice of the multiple meta slices META_SLICE<1:15> as a first dirty slice by adjusting first state information NEW of the updated meta slice. Furthermore, the controller 200 may classify a flushed first dirty slice of the first dirty slices as a second dirty slice by adjusting both first state information NEW and second state information OLD of the flushed first dirty slice. Furthermore, the controller 200 may classify a flushed second dirty slice of the second dirty slices as a clean meta slice by adjusting second state information OLD of the flushed second dirty slice. Furthermore, the controller 200 may classify an updated second dirty slice of the second dirty slices as a third dirty slice by adjusting first state information NEW of the updated second dirty slice. Furthermore, the controller 200 may classify a flushed third dirty slice of the third dirty slices as the second dirty slice by adjusting first state information NEW of the flushed third dirty slice.

In this case, the clean meta slice has a concept opposite to that of the dirty meta slice. A meta slice whose values stored in the main memory 300 and the memory device 100 are the same, among the multiple meta slices META_SLICE<1: 15>, may be classified as the clean meta slice.

As described above, the controller 200 may adjust values of the first state information NEW and second state information OLD corresponding to each of the multiple meta slices META_SLICE<1:15> depending on whether an update operation or a flush operation is performed on each of the multiple meta slices META_SLICE<1:15>. Accordingly, the controller 200 may classify the state of each of the multiple meta slices META_SLICE<1:15> as the state of any one of the clean meta slice, the first dirty slice, the second dirty slice, and the third dirty slice.

More specifically, the controller 200 may classify an updated meta slice of the multiple meta slices META_SLICE<1:15> as the first dirty slice. Furthermore, the controller 200 may classify the flushed first dirty slice as the second dirty slice by performing a flush operation on the first dirty slice. Furthermore, the controller 200 may classify the flushed second dirty slice as the clean meta slice by performing a flush operation on the second dirty slice. Furthermore, the controller 200 may classify the updated second dirty slice as the third dirty slice by performing an update operation on the second dirty slice. Furthermore, the controller 200 may classify the flushed third dirty slice as the second dirty slice by performing a flush operation on the third dirty slice.

In this case, the controller 200 may permit the update operation for the multiple meta slices META_SLICE<1:15> in a section in which the flush operation is performed on each of the first dirty slice, the second dirty slice, and the third dirty slice, that is, a section in which each of the first dirty slice, the second dirty slice, and the third dirty slice is written in the memory device 100. The controller 200 may permit the update operation for the multiple meta slices META_SLICE<1:15> in the flush operation section as described above because the controller 200 may adjust the state of each of the multiple meta slices META_SLICE<1:15> in several steps by controlling two pieces of state information, that is, the first state information NEW and the second state information OLD, to correspond to each of the multiple meta slices META_SLICE<1:15>.

For example, the first dirty slice stored in the main memory 300, on which a flush operation is performed, has been classified as the second dirty slice at timing at which the flush operation is performed. Accordingly, if the first dirty slice is updated while the flush operation is performed thereon, it may be classified as the third dirty slice. The first dirty slice stored in the main memory 300, on which a flush operation is performed, has been classified as the second dirty slice at timing at which the flush operation is performed. Accordingly, if the first dirty slice is not updated while the flush operation is performed thereon, it may be continuously classified as the second dirty slice.

Likewise, the second dirty slice stored in the main memory 300, on which a flush operation is performed, has been classified as the clean meta slice at timing at which the flush operation is performed. Accordingly, if the second dirty slice is updated while the flush operation is performed thereon, it may be classified as the first dirty slice. The second dirty slice stored in the main memory 300, on which the flush operation is performed, has been classified as the clean meta slice at timing at which the flush operation is performed. Accordingly, if the second dirty slice is not updated while the flush operation is performed thereon, it may be continuously classified as the clean meta slice.

Likewise, the third dirty slice stored in the main memory 300, on which a flush operation is performed, has been classified as the second dirty slice at timing at which the flush operation is performed. Accordingly, if the third dirty slice is updated while the flush operation is performed thereon, it may be classified as the third dirty slice again. The third dirty slice stored in the main memory 300, on which the flush operation is performed, has been classified as the second dirty slice at timing at which the flush operation is performed. Accordingly, if the third dirty slice is not updated while the flush operation is performed thereon, it may be continuously classified as the second dirty slice.

Furthermore, the controller 200 may generate journal data JOURNAL_DATA. The journal data JOURNAL_DATA may include history information for the update contents of meta data META_DATA. Accordingly, the controller 200 may derive the meta data META_DATA before or after update, based on the journal data JOURNAL_DATA. For example, the journal data JOURNAL_DATA may include information on a type indicative of an operation of changing the meta data META_DATA and data for restoring the change in the meta data META_DATA. In this case, the information on the type indicative of an operation of changing the meta data META_DATA may include pieces of information that define the types for all operations capable of changing the meta data META_DATA, such as a write operation, an operation of allocating a memory block, and an operation of copying data stored in a page. Furthermore, the data for restoring the change in the meta data META_DATA may include a logical address, a previous physical address, and a new physical address.

Furthermore, the controller 200 may store, in the memory device 100, journal data JOURNAL_DATA generated therein by performing a flush operation on the journal data JOURNAL_DATA. In this case, the flush operation for the journal data JOURNAL_DATA may be performed only when the size of the journal data JOURNAL_DATA is a set size. Specifically, the controller 200 may store the journal data JOURNAL_DATA in the main memory 300. In particular, in order to store two journal data JOURNAL_DATA<1:2> in the main memory 300, the controller 200 may reserve two spaces in which data having a set size can be stored. The controller 200 may select a first storage space of the two storage spaces, reserved for the storage of the journal data JOURNAL_DATA<1:2>, in the main memory 300, and may store the first journal data JOURNAL_DATA1 in the first storage space. If the first journal data JOURNAL_DATA1 stored in the first storage space of the main memory 300 has the set size, the controller 200 may set the first journal data JOURNAL_DATA1 as journal retention data, and may write the first journal data JOURNAL_DATA1 in the memory device 100 by performing a flush operation on the first journal data JOURNAL_DATA1 having the set size. In this case, the controller 200 may set, as new journal data, the second journal data JOURNAL_DATA2 newly generated due to the update of the meta data META_DATA and store the second journal data JOURNAL_DATA2 in the main memory 300, in an operation section in which the first journal data JOURNAL_DATA1 set as the journal retention data is written in the memory device 100, that is, even in the state in which the flush operation for the first journal data JOURNAL_DATA1 set as the journal retention data has not been completed. That is, separately from the execution of the flush operation for the first journal data JOURNAL_DATA1 set as the journal retention data, the controller 200 may select a second storage space of the two storage spaces, reserved for the storage of the journal data JOURNAL_DATA<1:2>, in the main memory 300, and may store, in the second storage space, the second journal data JOURNAL_DATA2 set as the new journal data. When the flush operation for the first journal data JOURNAL_DATA1 set as the journal retention data is completed, that is, when an operation of writing the first journal data JOURNAL_DATA1, set as the journal retention data, in a storage space within the memory device 100 is completed, the controller 200 may delete or invalidate, from the main memory 300, the first journal data JOURNAL_DATA1 stored in the first storage space of the two storage spaces reserved for the storage of journal data JOURNAL_DATA<1:2>.

As described above, separately from the execution of the flush operation for the first journal data JOURNAL_DATA1 set as the journal retention data, the controller 200 has performed the operation of selecting the second storage space of the two storage spaces, reserved for the storage of the journal data JOURNAL_DATA<1:2>, in the main memory 300 and storing, in the second storage space, the second journal data JOURNAL_DATA2 set as the new journal data. In this case, if the second journal data JOURNAL_DATA2 stored in the second storage space of the main memory 300 has the set size, the controller 200 may set the second journal data JOURNAL_DATA2 as the journal retention data, and may write the second journal data JOURNAL_DATA2 in the memory device 100 by performing a flush operation on the second journal data JOURNAL_DATA2 having the set size. In this case, the controller 200 may set, as new journal data, the first journal data JOURNAL_DATA1 newly generated due to the update of the meta data META_DATA and store the first journal data JOURNAL_DATA1 in the main memory 300 in an operation section in which the second journal data JOURNAL_DATA2 set as the journal retention data is written in the memory device 100, that is, even in the state in which the flush operation for the second journal data JOURNAL_DATA2 set as the journal retention data has not been completed. That is, separately from the execution of the flush operation for the second journal data JOURNAL_DATA2 set as the journal retention data, the controller 200 may select the first storage space of the two storage spaces, reserved for the storage of the journal data JOURNAL_DATA<1:2>, in the main memory 300, and may store, in the first storage space, the first journal data JOURNAL_DATA1 set as the new journal data. When the flush operation for the second journal data JOURNAL_DATA2 set as the journal retention data is completed, that is, when an operation of writing the second journal data JOURNAL_DATA2 in a storage space within the memory device 100 is completed, the controller 200 may delete or invalidate, from the main memory 300, the second journal data JOURNAL_DATA2 stored in the second storage space of the two storage spaces reserved for the storage of the journal data JOURNAL_DATA<1:2>.

As described above, the controller 200 according to an embodiment may reserve the two storage spaces of the main memory 300 for the storage of the journal data JOURNAL_DATA<1:2>, and may alternately use the two storage spaces. Accordingly, the controller 200 may generate new journal data JOURNAL_DATA even in an operation section in which a flush operation for the journal data JOURNAL_DATA having the set size, that is, an operation of writing the journal data JOURNAL_DATA in the memory device 100 is performed. In this case, if new journal data can be generated, this may mean that the execution of an update operation for meta data META_DATA is permitted. Accordingly, the controller 200 may permit the execution of the update operation for the meta data META_DATA, for example, in the state in which the journal data JOURNAL_DATA has the set size and a flush operation is performed thereon or in the state in which the journal data JOURNAL_DATA has a size smaller than the set size, regardless of a state of the journal data JOURNAL_DATA. As described above, the controller 200 permits the execution of the update operation for the meta data META_DATA regardless of the state of the journal data JOURNAL_DATA. Thus, the controller 200 may perform a flush operation on the meta data META_DATA regardless of the state of the journal data JOURNAL_DATA. For example, as a result of the check of the state of each of the multiple meta slices META_SLICE<1:15>, stored in the main memory 300, in the state in which the journal data JOURNAL_DATA has a size smaller than the set size, if any one of the first dirty slice, the second dirty slice, and the third dirty slice is present, the controller 200 may perform a flush operation on a corresponding slice.

FIGS. 21A to 21G describe a method of managing meta data in the memory system 1000 of FIG. 19 according to an embodiment, which are similar to FIGS. 5A to 5G of U.S. patent application Ser. No. 17/036,960.

Figure 21A:
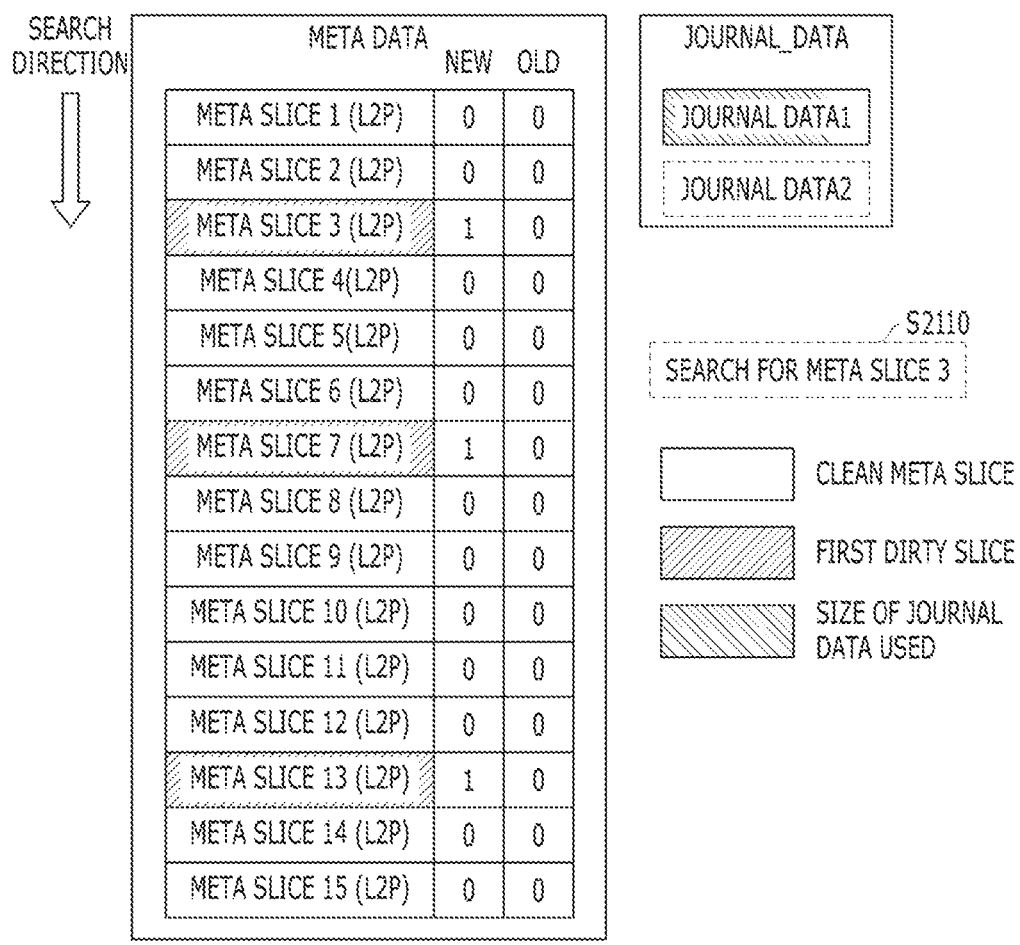
FIGS. 21A to 21G describe a method of managing meta data in the memory system according to an embodiment.

Referring to FIG. 21A, the controller 200 may check the state of each of the multiple meta slices META_SLICE<1:15>, stored in the main memory 300, in a round robin manner.

For example, in FIG. 21A, a third meta slice META_SLICE 3, a seventh meta slice META_SLICE 7, and a thirteenth meta slice META_SLICE 13, among the multiple meta slices META_SLICE<1:15> stored in the main memory 300, may be classified as the first dirty slices. That is, in FIG. 21A, the controller 200 may classify each of the third meta slice META_SLICE 3, the seventh meta slice META_SLICE 7, and the thirteenth meta slice META_SLICE 13 as the first dirty slice by setting, to "1", the first state information NEW of each of the third meta slice META_SLICE 3, the seventh meta slice META_SLICE 7, and the thirteenth meta slice META_SLICE 13, among the multiple meta slices META_SLICE<1:15> stored in the main memory 300, and setting, to "0", the second state information OLD of each of the third meta slice META_SLICE 3, the seventh meta slice META_SLICE 7, and the thirteenth meta slice META_SLICE 13. In FIG. 21A, the controller 200 may classify each of the remaining meta slices META_SLICE<1, 2, 4:6, 8:12, 14, 15> as the clean meta slice by setting, to an initial value of "0", both the first state information NEW and second state information OLD of each of the remaining meta slices META_SLICE<1, 2, 4:6, 8:12, 14, 15> except the third meta slice META_SLICE 3, seventh meta slice META_SLICE 7, and thirteenth meta slice META_SLICE 13 of the multiple meta slices META_SLICE<1:15>.

In such a state, the controller 200 may check the state of each of the multiple meta slices META_SLICE<1:15>, stored in the main memory 300, in a round robin manner. As a result of the checking, the controller 200 may be aware that the third meta slice META_SLICE 3 has been classified as the first dirty slice (S2110).

Figure 21B:
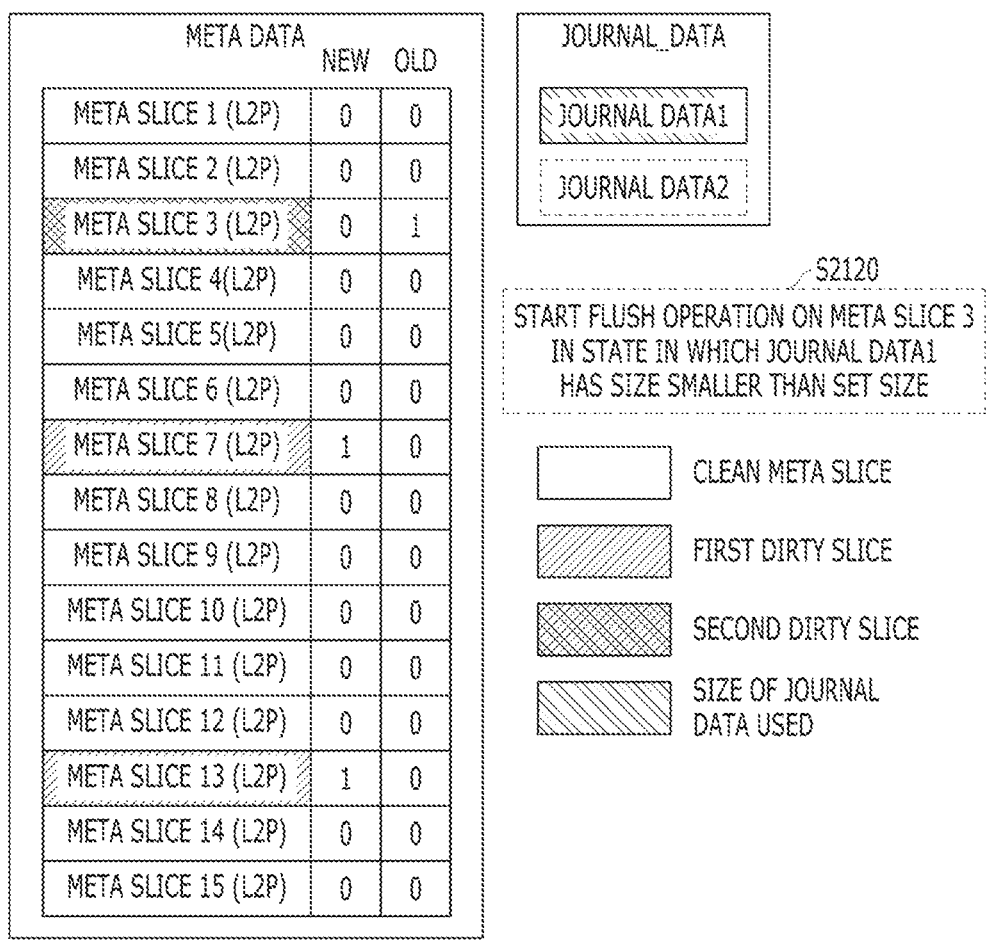

Referring to FIG. 21B, as the controller 200 has checked that the third meta slice META_SLICE 3 has been classified as the first dirty slice as described with reference to FIG. 21A, the controller 200 may start a flush operation on the third meta slice META_SLICE 3 even in the state in which the first journal data JOURNAL_DATA1 has a size smaller than a set size (S2120). In this case, the controller 200 may adjust the first state information NEW of the third meta slice META_SLICE 3, stored in the main memory 300, from "1" to "0" and the second state information OLD of the third meta slice META_SLICE 3 from "0" to "1" at timing at which the flush operation for the third meta slice META_SLICE 3 is started. That is, the controller 200 may classify, as the second dirty slice, the third meta slice META_SLICE 3, stored in the main memory 300, at the timing at which the flush operation for the third meta slice META_SLICE 3 is started.

Figure 21C:
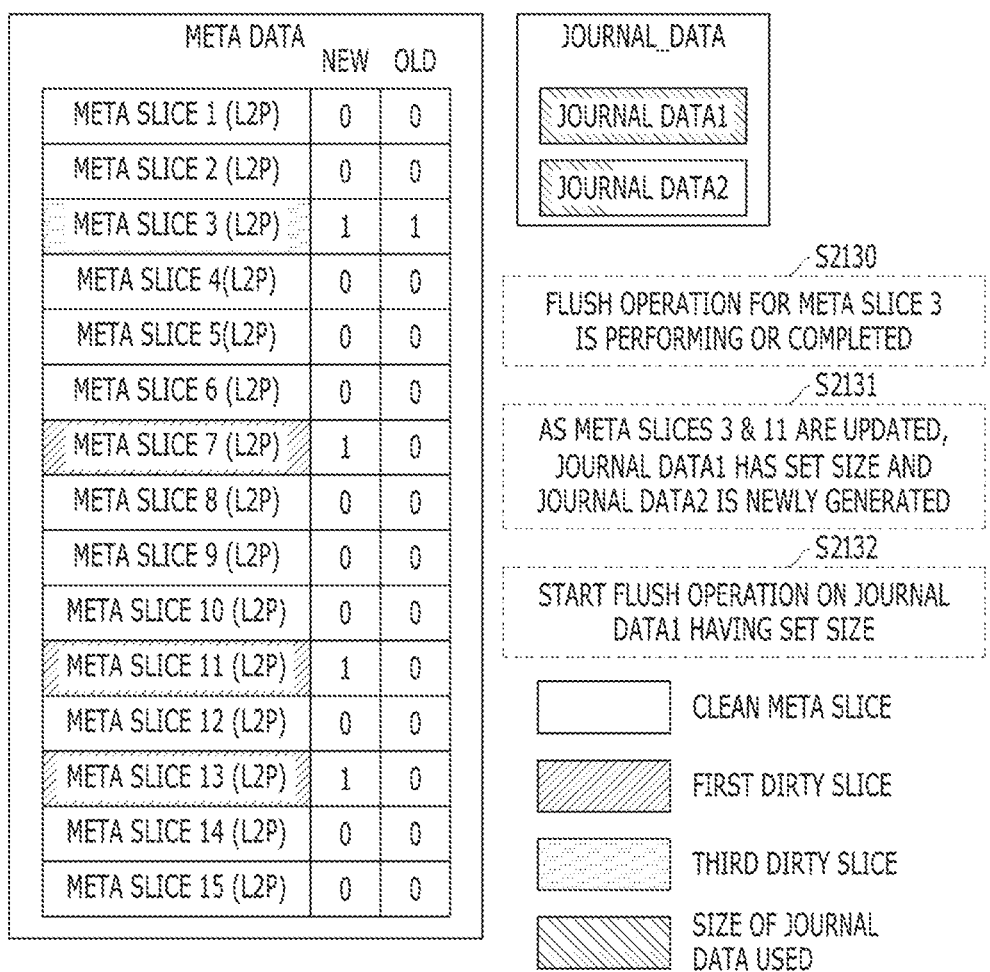

Referring to FIG. 21C, the controller 200 may be performing or have completed the flush operation for the third meta slice META_SLICE 3 described with reference to FIG. 21B (S2130). In the state in which the controller 200 is performing or has completed the flush operation for the third meta slice META_SLICE 3 as described above, the third meta slice META_SLICE 3 may be updated, and thus the first journal data JOURNAL_DATA1 may have the set size (S2131). In this case, as described with reference to FIG. 21B, the third meta slice META_SLICE 3 stored in the main memory 300 has been classified as the second dirty slice at the timing at which the flush operation for the third meta slice META_SLICE 3 is started. Accordingly, the third meta slice META_SLICE 3 stored in the main memory 300 may be classified as the third dirty slice again in response to the update of the third meta slice META_SLICE 3. That is, as described with reference to FIG. 21B, at the timing at which the flush operation for the third meta slice META_SLICE 3 is started, the controller 200 has classified, as the second dirty slice, the third meta slice META_SLICE 3, stored in the main memory 300, by setting the first and second state information NEW and OLD of the third meta slice META_SLICE 3 to "0" and "1", respectively. In such a state, when an update operation is performed on the third meta slice META_SLICE 3, the controller 200 may classify, as the third dirty slice, the third meta slice META_SLICE 3 stored in the main memory 300, by setting the first and second state information NEW and OLD of the third meta slice META_SLICE 3 to "1" and "1", respectively.

Furthermore, as the eleventh meta slice META_SLICE is updated in the state in which the first journal data JOURNAL_DATA1 has the set size, the second journal data JOURNAL_DATA2 may be newly generated (S2131). In this case, the controller 200 may classify the updated eleventh meta slice META_SLICE 11 as the first dirty slice by setting the first state information NEW of the updated eleventh meta slice META_SLICE 11 to "1" and second state information OLD of the updated eleventh meta slice META_SLICE 11 to "0." Furthermore, since the first journal data JOURNAL_DATA1 has the set size, the controller 200 may start a flush operation on the first journal data JOURNAL_DATA1 having the set size (S2132). For reference, in FIG. 21C, an operation section for the flush operation for the third meta slice META_SLICE 3 and an operation section for the flush operation for the first journal data JOURNAL_DATA1 may overlap or may not overlap.

Figure 21D:
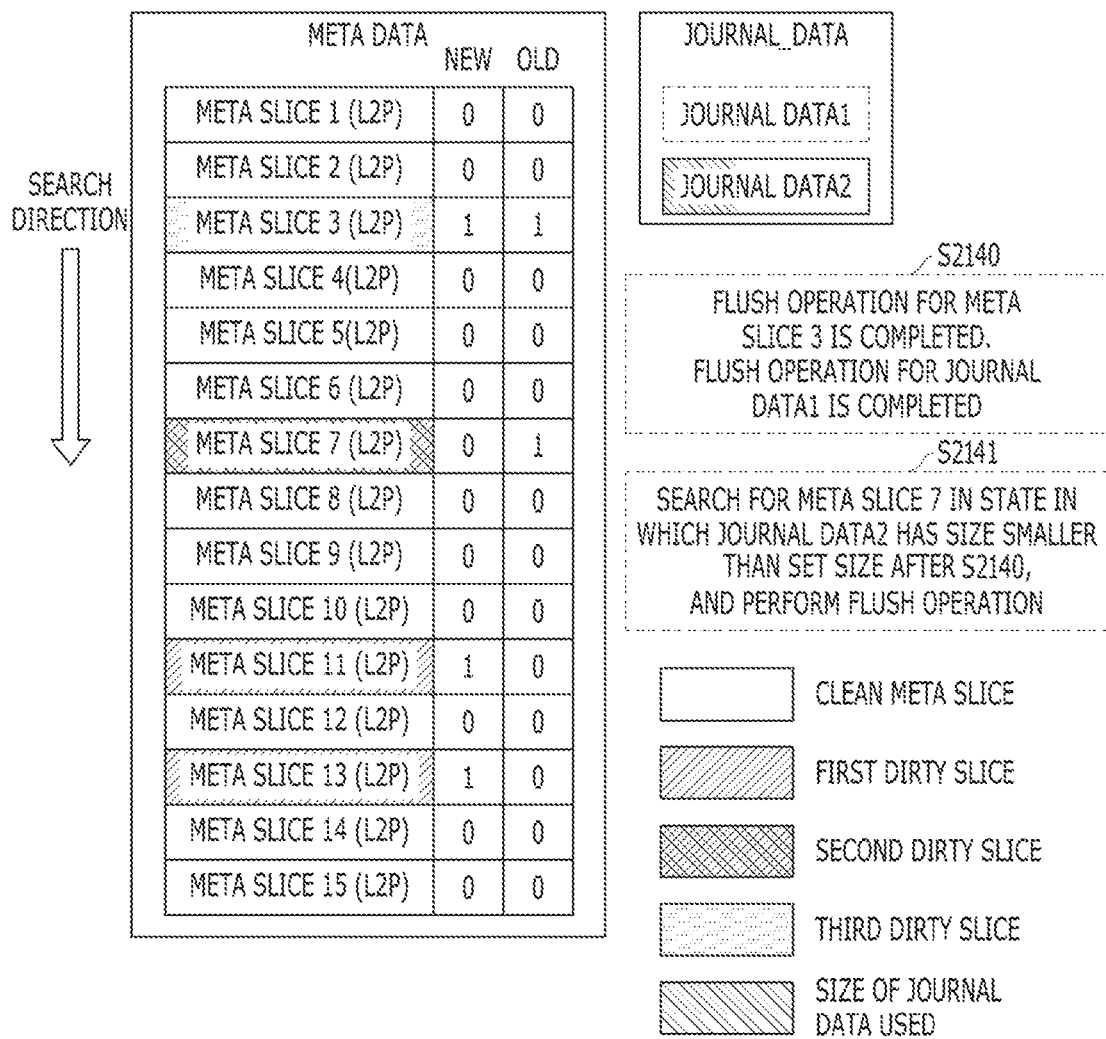

Referring to FIG. 21D, it may be assumed that the flush operation for the third meta slice META_SLICE 3 started in FIG. 21B has been completed in FIG. 21D. Furthermore, it may be assumed that the flush operation for the first journal data JOURNAL_DATA1 started in FIG. 21C has been completed in FIG. 21D (S2140).

Accordingly, the controller 200 may delete or invalidate the first journal data JOURNAL_DATA1 from the main memory 300.

Furthermore, the controller 200 may check the state of each of the multiple meta slices META_SLICE<1:15>, stored in the main memory 300, in a round robin manner. In this case, since check-up to the third meta slice META_SLICE 3 has already been completed in FIG. 21A, the controller 200 may check the state of each of the remaining meta slices from the fourth meta slice META_SLICE 4 in FIG. 21D. For this reason, although the third meta slice META_SLICE 3 has been classified as the third dirty slice, the controller 200 does not search for the third meta slice META_SLICE 3, but may search for the seventh meta slice META_SLICE 7. That is, the controller 200 may check the state of each of the fourth to seventh meta slices META_SLICE<4:7>, and may be aware that the seventh meta slice META_SLICE 7 has been classified as the first dirty slice, as a result of the checking (S2141).

As described above, since the controller 200 has checked that the seventh meta slice META_SLICE 7 has been classified as the first dirty slice, the controller 200 may start a flush operation on the seventh meta slice META_SLICE 7 even in the state in which the second journal data JOURNAL_DATA2 has a size smaller than the set size (S2141).

In this case, the controller 200 may adjust the first state information NEW of the seventh meta slice META_SLICE 7, stored in the main memory 300, from "1" to "0" and the second state information OLD of the seventh meta slice META_SLICE 7 from "0" to "1" at timing at which the flush operation for the seventh meta slice META_SLICE 7 is started. That is, the controller 200 may classify, as the second dirty slice, the seventh meta slice META_SLICE 7, stored in the main memory 300, at the timing at which the flush operation for the seventh meta slice META_SLICE 7 is started.

Figure 21E:
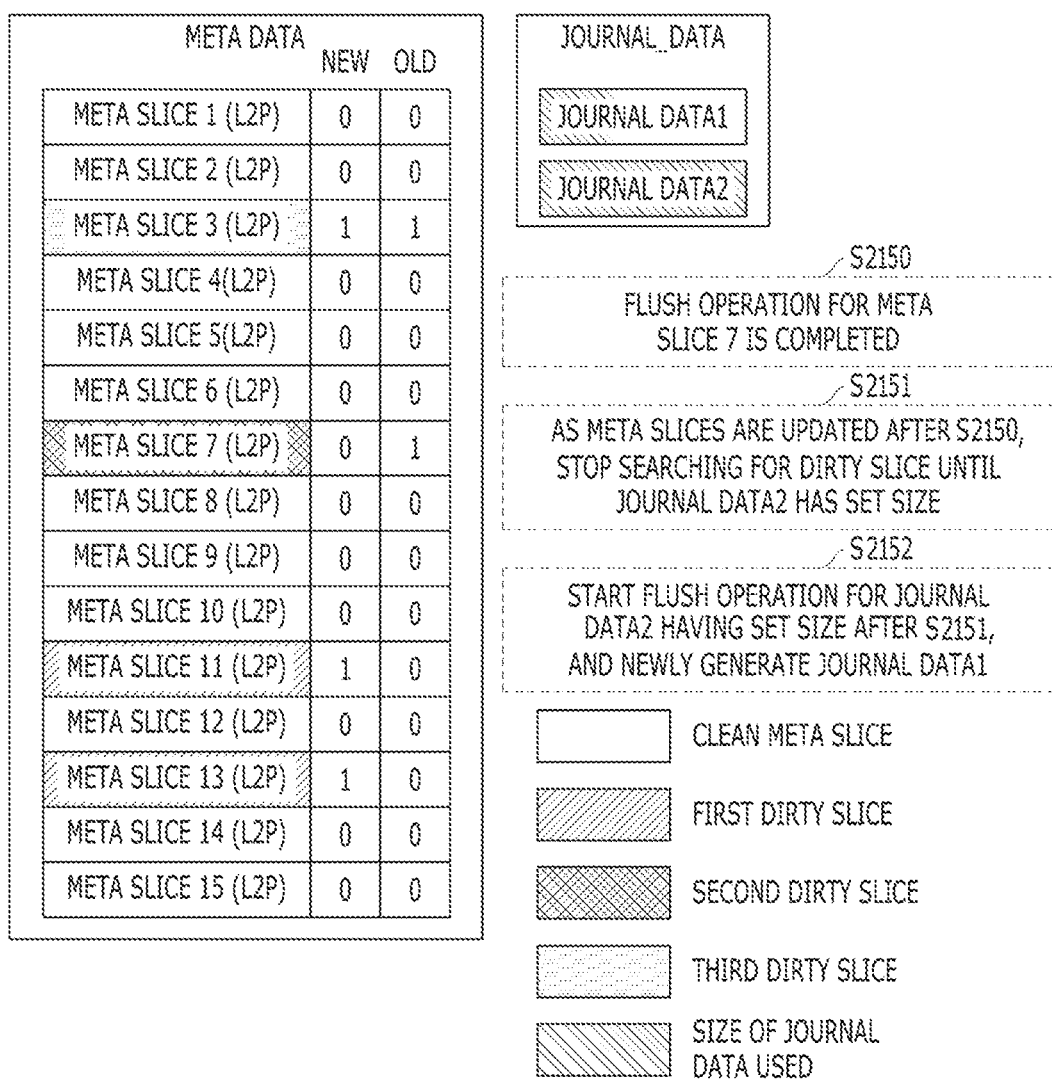

Referring to FIG. 21E, it may be assumed that the flush operation for the seventh meta slice META_SLICE 7 started in FIG. 21D has been completed in FIG. 21E (S2150).

Although the flush operation for the seventh meta slice META_SLICE 7 has been completed as described above, the controller 200 may stop an operation of searching for another dirty slice until the second journal data JOURNAL_DATA2 has the set size (S2151). This is for enabling a flush operation for journal data and a flush operation for a meta slice to be alternately performed. The reason for this is that if one journal data is flushed while several meta slices are flushed due to lots of meta slices which may be classified as the dirty slices, meta data may be difficult to recover when restored using the journal data. Accordingly, the controller 200 according to an embodiment may use a method of alternately flushing journal data and meta data.

As the update of the multiple meta slices META_SLICE<1:15> is repeated over time, the second journal data JOURNAL_DATA2 may have the set size. Accordingly, the controller 200 may start a flush operation for the second journal data JOURNAL_DATA2 having the set size (S2152). In the state in which the flush operation for the second journal data JOURNAL_DATA2 has been started, the controller 200 may newly generate the first journal data JOURNAL_DATA1 (S2152). For reference, it may be assumed that although not directly illustrated in the drawings, an update operation for the multiple meta slices META_SLICE<1:15> is repeatedly performed until the second journal data JOURNAL_DATA2, having a size smaller than the set size, has the set size.

Figure 21F:
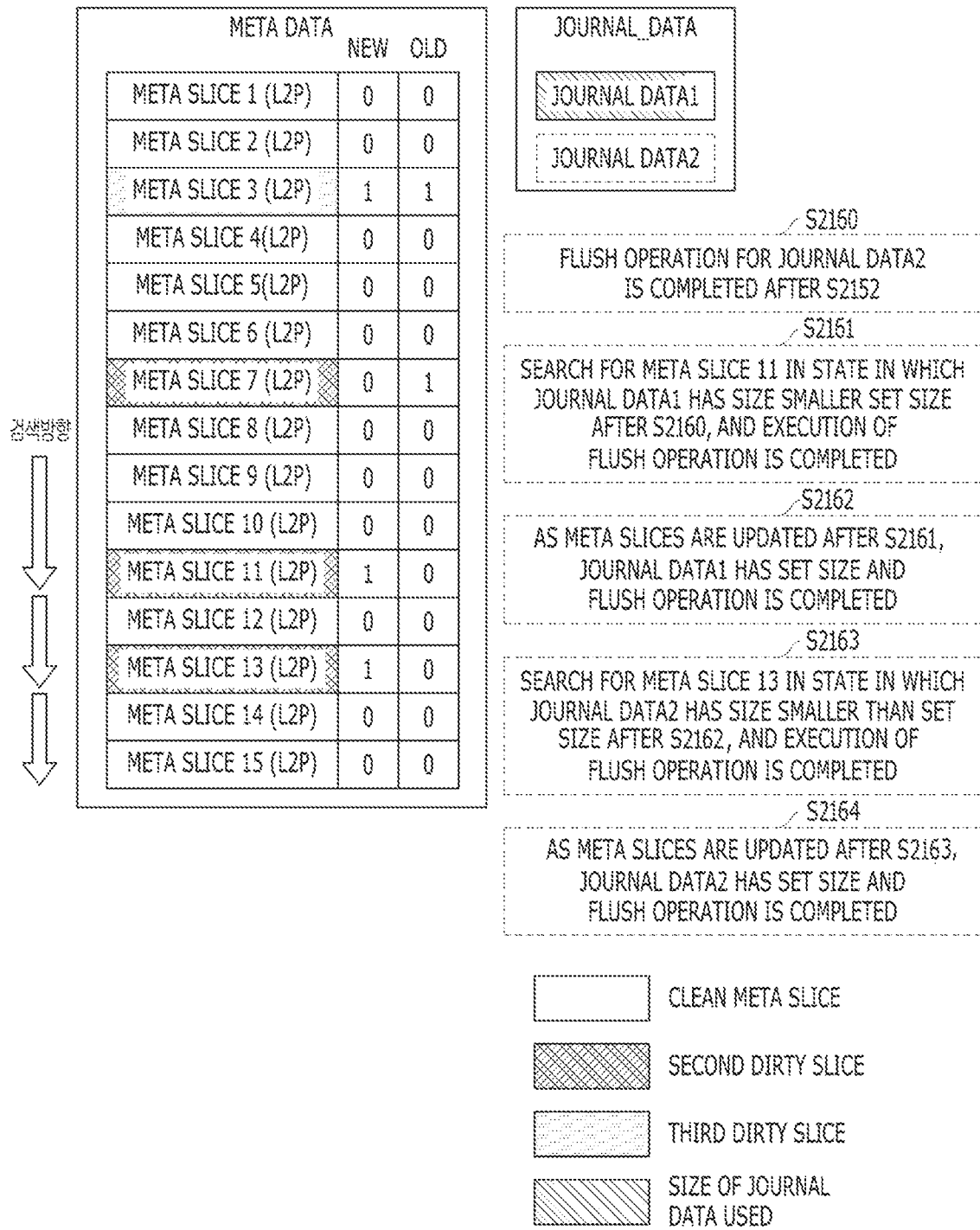

Referring to FIG. 21F, it may be assumed that the aforementioned operations described with reference to FIGS. 21A to 21E are repeated.

Specifically, it may be assumed that the flush operation for the second journal data JOURNAL_DATA2 started in FIG. 21E has been completed in FIG. 21F (S2160). In this case, the controller 200 may newly generate the first journal data JOURNAL_DATA1 according to the operation of updating the meta slices, regardless of the completion of the flush operation for the second journal data JOURNAL_DATA2.

Furthermore, since the flush operation for the second journal data JOURNAL_DATA2 has been completed, the controller 200 may restart an operation of searching for another dirty slice and thus check that the eleventh meta slice META_SLICE 11 has been classified as the first dirty slice. Accordingly, the controller 200 may perform a flush operation on the eleventh meta slice META_SLICE 11 even in the state in which the first journal data JOURNAL_DATA1 has a size smaller the set size (S2161).

After the flush operation for the eleventh meta slice META_SLICE 11 is completed, the controller 200 may stop the operation of searching for another dirty slice until the first journal data JOURNAL_DATA1 has the set size as the meta slices are updated.

As the update of the multiple meta slices META_SLICE<1:15> is repeated over time, the first journal data JOURNAL_DATA1 may have the set size. Accordingly, the controller 200 may start a flush operation for the first journal data JOURNAL_DATA1 having the set size (S2162).

In this case, the controller 200 may newly generate the second journal data JOURNAL_DATA2 according to the operation of updating the meta slices, regardless of the completion of the flush operation for the first journal data JOURNAL_DATA1.

Furthermore, when the flush operation for the first journal data JOURNAL_DATA1 is completed, the controller 200 may restart an operation of searching for another dirty slice and thus check that the thirteenth meta slice META_SLICE 13 has been classified as the first dirty slice. Accordingly, the controller 200 may perform a flush operation on the thirteenth meta slice META_SLICE 13 even in the state in which the second journal data JOURNAL_DATA2 has a size smaller than the set size (S2163).

After the flush operation for the thirteenth meta slice META_SLICE 13 is completed, the controller 200 may stop the operation of searching for another dirty slice until the second journal data JOURNAL_DATA2 has the set size as the meta slices are updated.

As the update of the multiple meta slices META_SLICE<1:15> is repeated over time, the second journal data JOURNAL_DATA2 may have the set size. Accordingly, the controller 200 may start a flush operation for the second journal data JOURNAL_DATA2 having the set size (S2164).

In this case, the controller 200 may newly generate the first journal data JOURNAL_DATA1 according to the operation of updating the meta slices, regardless of the completion of the flush operation for the second journal data JOURNAL_DATA2.

Furthermore, when the flush operation for the second journal data JOURNAL_DATA2 is completed, the controller 200 may restart an operation of searching for another dirty slice and thus complete an operation of checking once the states of all the multiple meta slices META_SLICE<1:15> in a round robin manner.

Figure 21G:
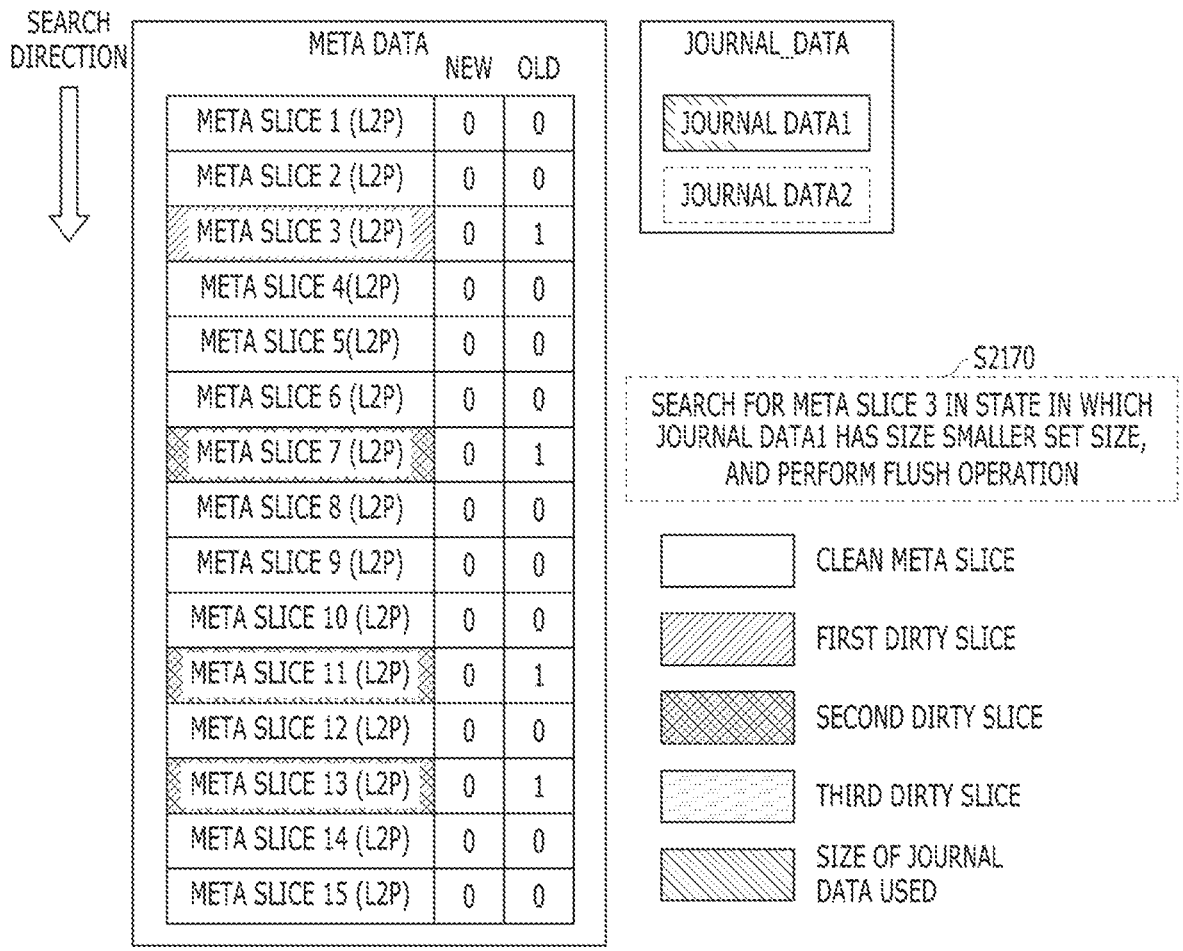

Referring to FIG. 21G, since the operation of checking once the states of all the multiple meta slices META_SLICE<1:15>, stored in the main memory 300, in a round robin manner has been completed in FIG. 21F, the controller 200 may recheck the state of each of the multiple meta slices META_SLICE<1:15>, stored in the main memory 300, in a round robin manner.

Accordingly, the controller 200 may check the state of each of the multiple meta slices META_SLICE<1:15>, stored in the main memory 300, in a round robin manner, and can be aware that the third meta slice META SLICE 3 has been classified as the third dirty slice, as a result of the check (S2170).

As described above, since the controller 200 has checked that the third meta slice META_SLICE 3 has been classified as the third dirty slice, the controller 200 may start a flush operation for the third meta slice META_SLICE 3 even in the state in which the first journal data JOURNAL_DATA1 has a size smaller the set size (S2170). In this case, the controller 200 may adjust the first state information NEW of the third meta slice META_SLICE 3, stored in the main memory 300, from "1" to "0" and continue to maintain the second state information OLD of the third meta slice META_SLICE 3 to "1", at timing at which the flush operation for the third meta slice META_SLICE 3 is started. That is, the controller 200 may classify, as the second dirty slice, the third meta slice META_SLICE 3, stored in the main memory 300, at the timing at which the flush operation for the third meta slice META_SLICE 3 is started.

According to this technology, when multiple meta slices included in meta data and journal data corresponding to the update of a meta slice are written in the memory device, an operation of writing the meta slice and an operation of writing the journal data are controlled to be asynchronously performed. Accordingly, an update of a meta slice on which a write operation is performing can be permitted.

Accordingly, there are effects in that a time taken for an operation of writing meta data in the memory device can be minimized and performance of the entire memory system can be improved.

While various embodiments have been described above, it will be understood to those skilled in the art that the embodiments described are by way of example only. Accordingly, the system and device described herein should not be limited based on the described embodiments.

What is claimed is:

1. A memory controller comprising:
   a processor configured to generate commands for accessing data stored in a main memory;
   a scheduling circuit configured to receive the commands, re-order the commands based on a result of comparing each of addresses of the main memory corresponding to the commands, and output the commands; and
   a filtering circuit configured to store information on an address of the main memory corresponding to a write command among the commands, provide a response for receiving the write command to the scheduling circuit upon receiving the write command from the scheduling circuit, and provide the write command to the main memory,
   wherein the response for receiving the write command is sent to the scheduling circuit before the filtering circuit receives a write completion response for the write command from the main memory, and
   wherein, upon receiving the response, the scheduling circuit outputs a read command having an address different from the address of the main memory corresponding to the write command among the commands.

2. The memory controller of claim 1, wherein when first and second commands corresponding to a same address among the addresses of the main memory are sequentially input, the scheduling circuit holds the second command without outputting the second command until a response for receiving the first command is received from the filtering circuit.

3. The memory controller of claim 1, wherein the scheduling circuit outputs commands for different addresses among the addresses of the main memory according to a sequence of the commands received from the processor.

4. The memory controller of claim 1, wherein when the read command for the address of the main memory corresponding to the write command is input, the filtering circuit provides the read command to the main memory after the write completion response for the write command is received from the main memory.

5. The memory controller of claim 1, further comprising a cache memory coupled between the scheduling circuit and the filtering circuit,
wherein when data corresponding to the read command among the commands is stored in a cache line corresponding to an address of the read command, the cache memory provides the data stored in the cache line to the scheduling circuit.

6. The memory controller of claim 5, wherein when the data corresponding to the read command among the commands is absent in the cache line corresponding to the address of the read command, the cache memory transfers the read command to the filtering circuit.

7. The memory controller of claim 1, wherein the filtering circuit includes a lookup table storing the information on the address of the main memory corresponding to the write command.

8. The memory controller of claim 7, wherein when the write completion response for the write command is received from the main memory, the filtering circuit removes the information on the address of the main memory corresponding to the write command from the lookup table.

9. The memory controller of claim 1, wherein a plurality of addresses of the main memory are mapped with one address of a cache memory in caching data from the main memory to the cache memory.

10. The memory controller of claim 9, wherein the main memory is a dynamic random access memory.

11. The memory controller of claim 9, wherein the cache memory is a static random access memory.

12. A method of operating a memory controller, the method comprising:
generating, by a processor, commands for accessing data stored in a main memory;
receiving the commands, re-ordering the commands based on a result of comparing each of addresses of the main memory corresponding to the commands, and outputting the commands, by a scheduling circuit;
storing information on an address of the main memory corresponding to a write command among the commands, providing a response for receiving the write command to the scheduling circuit upon receiving the write command from the scheduling circuit and providing the write command to the main memory, by a filtering circuit; and
outputting, upon receiving the response, a read command having an address different from the address of the main memory corresponding to the write command, by the scheduling circuit,
wherein providing the response for receiving the write command is performed before the filtering circuit receives a write completion response for the write command from the main memory.

13. The method of claim 12, further comprising:
sequentially receiving, by the scheduling circuit, first and second commands corresponding to a same address among the addresses of the main memory; and
holding, by the scheduling circuit, the second command without outputting the second command until a response for receiving the first command is received from the filtering circuit.

14. The method of claim 12, further comprising:
outputting, by the scheduling circuit, commands for different addresses among the addresses of the main memory according to a sequence of the commands received from the processor.

15. The method of claim 12, further comprising:
receiving, by the filtering circuit, the read command for the address of the main memory corresponding to the write command; and
providing, by the filtering circuit, the read command to the main memory after the write completion response for the write command is received from the main memory.

16. The method of claim 12, further comprising:
providing data stored in a cache line of a cache memory to the scheduling circuit, the data corresponding to the read command among the commands, the cache line corresponding to an address of the read command.

17. The method of claim 16, further comprising:
transferring, by the cache memory, the read command to the filtering circuit unless the data corresponding to the read command among the commands is stored in the cache line.

18. The method of claim 12, further comprising:
removing, by the filtering circuit, the information on the address of the main memory corresponding to the write command upon receiving the write completion response for the write command from the main memory.

* * * * *